US008341455B2

(12) United States Patent
Maki et al.

(10) Patent No.: US 8,341,455 B2
(45) Date of Patent: *Dec. 25, 2012

(54) MANAGEMENT METHOD AND SYSTEM FOR MANAGING REPLICATION BY TAKING INTO ACCOUNT CLUSTER STORAGE ACCESSIBILITY TO A HOST COMPUTER

(75) Inventors: Nobuhiro Maki, Yokohama (JP);
Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,229

(22) Filed: Sep. 20, 2011

(65) Prior Publication Data

US 2012/0011394 A1    Jan. 12, 2012

Related U.S. Application Data

(63) Continuation of application No. 12/687,770, filed on Jan. 14, 2010, now Pat. No. 8,086,895.

(30) Foreign Application Priority Data

Sep. 29, 2009   (JP) ................................ 2009-223617

(51) Int. Cl.
*G06F 11/00* (2006.01)
*G06F 11/21* (2006.01)

(52) U.S. Cl. ........ 714/4.11; 714/4.12; 714/4.2; 711/162

(58) Field of Classification Search .................. 714/4.11, 714/4.12, 4.2, 4.21, 15, 20; 711/162
See application file for complete search history.

(56) References Cited

U.S. PATENT DOCUMENTS

| | | | |
|---|---|---|---|
| 5,638,509 A | 6/1997 | Dunphy et al. | |
| 6,185,695 B1 | 2/2001 | Murphy et al. | |
| 6,865,655 B1 | 3/2005 | Andersen | |
| 7,093,163 B2 | 8/2006 | Kameyama et al. | |
| 7,228,398 B2 | 6/2007 | Iwamura et al. | |
| 7,370,235 B1 | 5/2008 | Gulve et al. | |
| 7,380,081 B2 * | 5/2008 | Ji et al. | 711/162 |
| 7,509,530 B2 | 3/2009 | Welts | |
| 7,512,757 B2 | 3/2009 | Hiraiwa et al. | |
| 7,549,083 B2 | 6/2009 | Eguchi et al. | |
| 7,555,647 B2 | 6/2009 | Yokose | |
| 7,778,984 B2 | 8/2010 | Zhang et al. | |
| 2008/0189572 A1 | 8/2008 | McBride et al. | |
| 2009/0106255 A1* | 4/2009 | Lacapra et al. | 707/10 |

* cited by examiner

*Primary Examiner* — Joseph Schell
(74) *Attorney, Agent, or Firm* — Foley & Lardner LLP

(57) ABSTRACT

A management system, which manages a host computer and a storage system, holds cluster information, specifies an active-state host computer and an inactive-state host computer based on a backup instruction specifying a virtual host identifier, determines the need for executing a replication for disaster recovery use, and when necessary, executes this replication for disaster recovery use in combination with a replication for backup use.

10 Claims, 34 Drawing Sheets

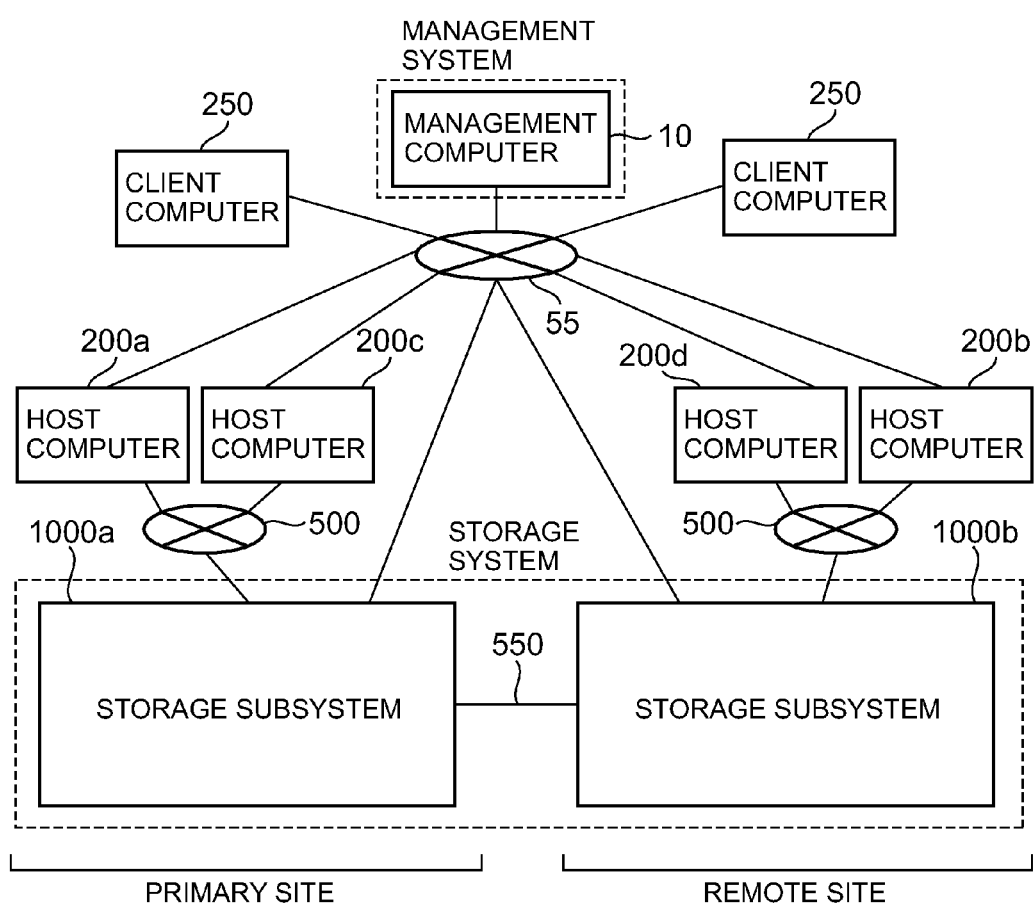

NORMAL STATE

AFTER FAILURE (POST-FAILOVER)

NORMAL STATE

AFTER FAILURE (POST-FAILOVER)

MANAGEMENT-SIDE STORAGE INFORMATION

FIG. 9

MANAGEMENT-SIDE BACKUP INFORMATION  — 18

| BACKUP ID | VIRTUAL HOST ID | AP | DATA1 | DATA2 | BACKUP | | |
| --- | --- | --- | --- | --- | --- | --- | --- |
| | | | | | START | INTERVAL | PROTECTION PERIOD |
| 1 | Host1 | Mail | StrGrp 1 | mbox | 2009 Sept5th 10:00 | 6 HOURS | 1 MONTH |
| 2 | Host2 | DB | Instance1 | DB1 | 2009 Aug.1st 22:00 | 1 HOUR | 3 DAYS |
| | | | | | | | |

MANAGEMENT-SIDE CATALOG INFORMATION  — 14

| BACKUP ID | REMOTE CLUSTER | REPLICATION GROUP | HOST | | ACTIVE HOST ID |
| --- | --- | --- | --- | --- | --- |
| | | | 1st | 2nd | |
| 1 | YES | Grp 1 | P-host1 | P-host2 | P-host1 |
| 2 | NO | Grp 2 | P-host3 | P-host4 | P-host4 |
| | | | | | |

1401  1403  1404  1405  1406  1407

MANAGEMENT-SIDE SITE CATALOG INFORMATION

| BACKUP ID | | 1 | ~15001 |
|---|---|---|---|
| HOST | | P-host1 | ~15002 |
| GENERATION-IN-USE | | FIRST GENERATION | ~15003 |
| NUMBER OF GENERATIONS | | 3 | ~15004 |
| GENERATION 1 | GROUP | Group1-1 | ~15005 |
| | TIME | T1 | ~15006 |
| GENERATION 2 | GROUP | Group1-2 | ~15007 |
| | TIME | T2 | ~15008 |
| GENERATION 3 | GROUP | Group1-3 | ~15009 |
| | TIME | T3 | ~15010 |

FIG. 12

13 → MANAGEMENT-SIDE AP-VOLUME CORRESPONDENCE INFORMATION

| HOST ID | VIRTUAL HOST ID | APPLICATION NAME | DATA1 | DATA2 | VOLUME ID |
|---|---|---|---|---|---|
| P-host1 | host1 | DB | Instance1 | DB1 | D: |
| | | DB | Instance1 | DB2 | E: |
| | | DB | Instance2 | DB3 | F: |
| | | Mail | StrGrp 1 | mbox | D: |
| | | | : | : | : |
| 13001 | 13002 | 13003 | 13004 | 13005 | 13006 |

FIG. 13

19 → MANAGEMENT-SIDE CLUSTER CONFIGURATION INFORMATION

| VIRTUAL HOST ID | REMOTE CLUSTER | PHYSICAL HOST ID | |
|---|---|---|---|
| | | 1st | 2nd |
| Host1 | YES | P-host1, | P-host2 |
| Host2 | NO | P-host3 | P-host4 |
| : | | : | : |
| 19001 | 19002 | 19003 | 19004 |

FIG. 14

STORAGE-SIDE REPLICATION PAIR INFORMATION 1210

| PAIR ID | VOLUME ID | REPLICATION STATUS INFORMATION | REPLICATION-TARGET STORAGE SYSTEM ID | REPLICATION-TARGET VOLUME ID | REPLICATION TYPE | REPLICATION GROUP ID |
|---|---|---|---|---|---|---|
| 1 | 23:10 | COPYING | 14005 | 23:20 | SYNCHRONOUS | Crp1 |
| 2 | 23:40 | COPYING | 14001 | 24:FF | LOCAL | Crp1-1 |
| .. | .. | .. | .. | .. | .. | .. |
| 12101 | 12102 | 12103 | 12104 | 12105 | 12106 | 12107 |

FIG. 15

STORAGE-SIDE VOLUME MANAGEMENT INFORMATION 1250

| HW LOGICAL VOLUME ID | VOLUME STATUS INFORMATION | CAPACITY | REPLICATION PAIR ID | COPY GROUP ID |
|---|---|---|---|---|
| 23:10 | PRIMARY | 10GB | 1 | Crp1 |
| 23:40 | PRIMARY | 10GB | 2 | Crp2 |
| .. | .. | .. | .. | .. |
| 12501 | 12502 | 12503 | 12504 | 12505 |

FIG. 34
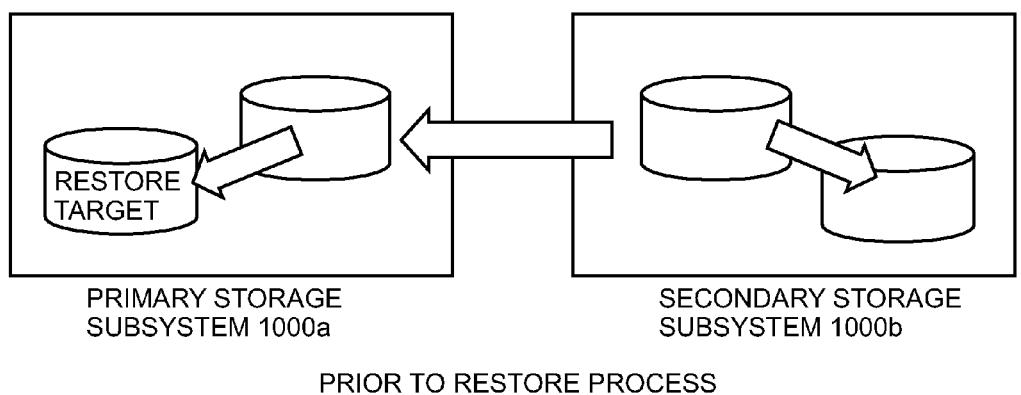
PRIOR TO RESTORE PROCESS
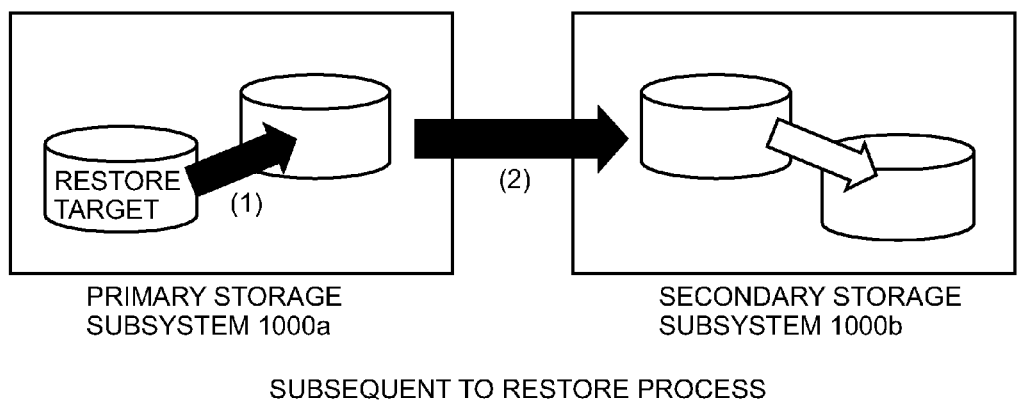
SUBSEQUENT TO RESTORE PROCESS

DATA TRANSFER REQUEST

MANAGEMENT METHOD AND SYSTEM FOR MANAGING REPLICATION BY TAKING INTO ACCOUNT CLUSTER STORAGE ACCESSIBILITY TO A HOST COMPUTER

CROSS-REFERENCE TO RELATED PATENT APPLICATIONS

Japan Priority Application 2009-223617 filed Sep. 29, 2009 including the specification, drawings, claims and abstract, is incorporated herein by reference in its entirety. This application is a Continuation of U.S. application Ser. No. 12/687,770, filed Jan. 14, 2010, incorporated herein by reference in its entirety.

BACKGROUND

The present invention generally relates to a backup and recovery using a storage system in a cluster environment.

The introduction of globalization and online business operations in recent years has made it preferable for corporate information systems to operate continuously 24-hours-a-day, 365-days-a-year. As a technology for achieving this, there is clustering technology. In general, clustering technology makes the resources of an information system, such as a server and storage system, redundant, and increases availability so that even when a failure occurs in one portion of the information system, it is possible to continue carrying out tasks on this information system by using the resources that have not been affected by the failure. Clustering technology comprises a local cluster that shares data in common, and a remote cluster, which replicates data and holds the data redundantly in different apparatuses. As a result of redundancy, clustering technology comprises a plurality of the same resources in each information system. This increase in resources is a problem since it consequently makes a user do complex settings. With respect to this problem, for example, the prior art of US Patent Publication No. 2004/0181707 (hereinafter referred to as Patent Literature 1) makes it possible to set a replication (explained below) that makes the contents of data in a plurality of storage systems match by specifying a cluster-targeted server in a remote cluster environment in which both servers and storage systems adopt a redundant configuration.

Alternatively, a corporate information system implements a backup in preparation for the destruction and loss of data resulting from an operational error or equipment failure. A backup refers to the replication of data that is utilized in the corporate information system. Since data replication places a huge work load on a computer, replication technology is used to reduce this load. As replication technology prior art, there is US Patent Publication No. 2009/0055613 (hereinafter referred to as Patent Literature 2). In Patent Literature 2, the computer does not replicate the data, and instead the storage system replicates data that is in a storage area of this storage system to another storage area.

SUMMARY

The thinking here is to realize a backup in a corporate information system that utilizes either local or remote clustering technology without compelling the user to make a complex setting. The Patent Literature 1 does not satisfy the above as it does not have a disclosure related to a backup. Since the Patent Literature 2 does not have a disclosure related to simplifying replication technology settings, it is not able to satisfy the above even when combined with the Patent Literature 1. Furthermore, the Patent Literature 1 only makes a disclosure related to remote clustering, and does not describe a local cluster that does not make the storage system redundant.

As described above, the prior art is not able to solve for the above-mentioned problem.

An object of the present invention is to provide a system that is able to perform a backup in a corporate information system that utilizes either local or remote clustering technology without compelling the user to make a complex setting.

A management system, which manages a host computer and a storage system, holds cluster information, identifies an active-state host computer and an inactive-state host computer based on an backup instruction that specifies a virtual host identifier, determines the need for the execution of a replication for disaster recovery use, and in a case where such a need exists, executes this disaster recovery replication in combination with a replication for backup use.

It is possible to achieve a backup in a computer system that utilizes either local or remote clustering technology without compelling the user to make a complex setting.

BRIEF DESCRIPTION OF THE DRAWINGS

FIG. 1 is a block diagram related to the configuration of a computer system;

FIGS. 5-1 and 5-2 show a backup configuration in a local cluster system;

FIGS. 6-1 and 6-2 show a backup configuration in a remote cluster system;

FIG. 9 shows an example of the configuration of management-side backup information 18 stored in the management computer 10;

FIG. 10 shows an example of the configuration of management-side catalog information 14 stored in the management computer 10;

FIG. 12 shows an example of the configuration of management-side AP-volume correspondence information 13 stored in the management computer 10;

FIG. 13 shows an example of the configuration of management-side cluster configuration information 19 stored in the management computer 10;

FIG. 14 shows an example of the configuration of storage-side replication information 1210 stored in the storage subsystem 1000 of a first embodiment of the present invention;

FIG. 15 shows an example of the configuration of storage-side volume management information 1250 stored in the storage subsystem 1000 of the first embodiment of the present invention;

FIG. 31 is a post-failover restore process for a failed host 200a;

FIG. 34 is a schematic diagram related to a replication process for data that the failed host 200a created subsequent to the failure;

DETAILED DESCRIPTION OF THE EMBODIMENT

Figure 2:
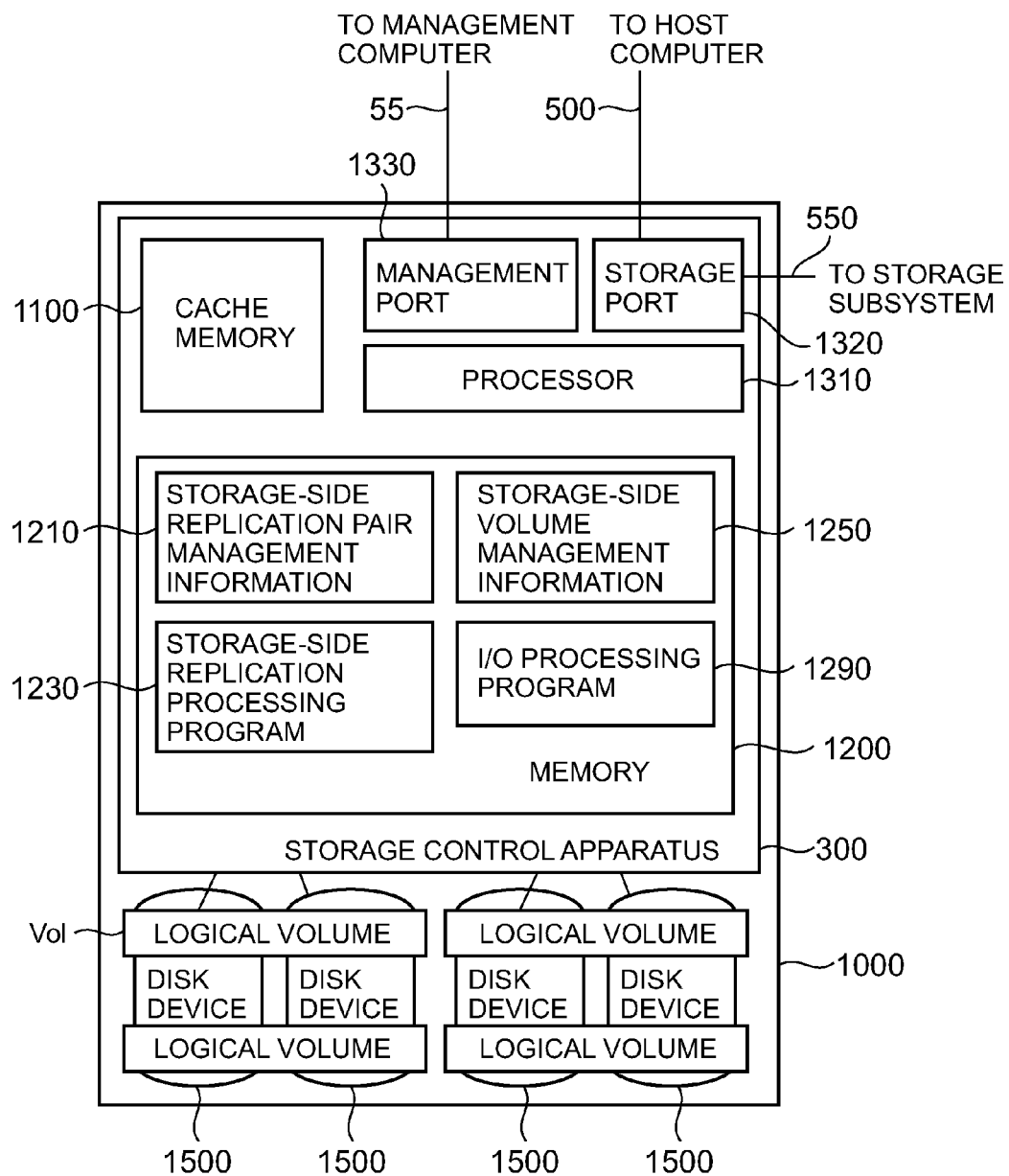
FIG. 2 is detailed diagram of a storage subsystem 1000.

The embodiment of the present invention will be explained below by referring to the drawings.

In the following explanation, the information of the present invention will be explained using expressions such as "xxx table", "xxx list", "xxx DB" or "xxx queue", but this information may be expressed using data structures other than the table, list, DB or queue. For this reason, in order to show that the information is not dependent on the data structure, the information may be called "xxx information" with respect to the "xxx table", the "xxx list", the "xxx DB" and the "xxx queue".

Further, when explaining the contents of the respective information, expressions such as "identification information", "identifier", "name", "ID", and "number" will be used, but since these expressions are not limited to physical entities, such as an apparatus or component, but rather are allocated for distinguishing between logical entities as well, these expressions are interchangeable.

In the following explanation, there may be instances when "program" is used as the subject of an explanation, but since a prescribed process is carried out by executing a program in accordance with the processor while using a memory and interface, the explanation may also use the processor as the subject. Further, a process that is disclosed having the program as the subject may be a process performed by a storage subsystem, a computer, such as a management server, and an information processing apparatus. Either all or a portion of the programs may be realized using dedicated hardware. The same holds true for the storage subsystem, and a process that is disclosed having the program as the subject may be a process that either a storage control apparatus or a storage system perform.

Further, various types of programs may be installed in the respective computers using a program delivery server or storage media.

Embodiment 1

(1-1) System Configuration

Figures 1, 5:
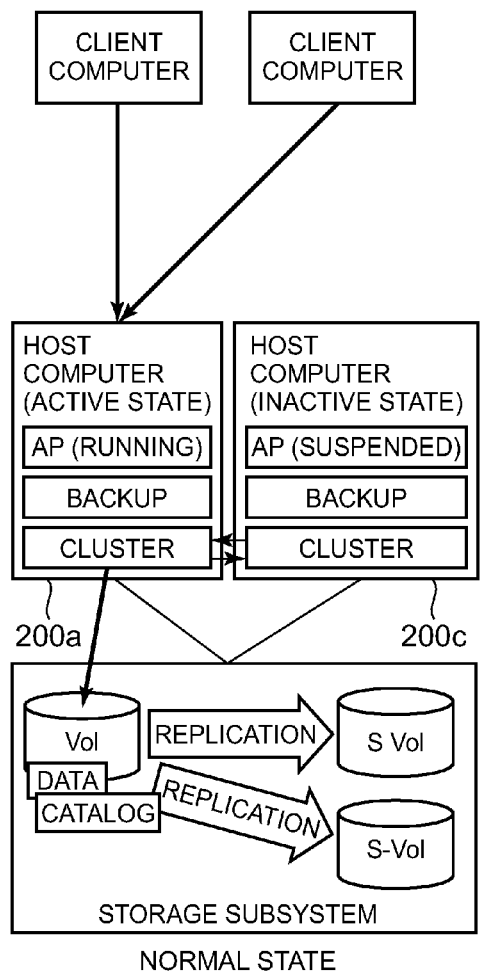
Figures 2, 5:
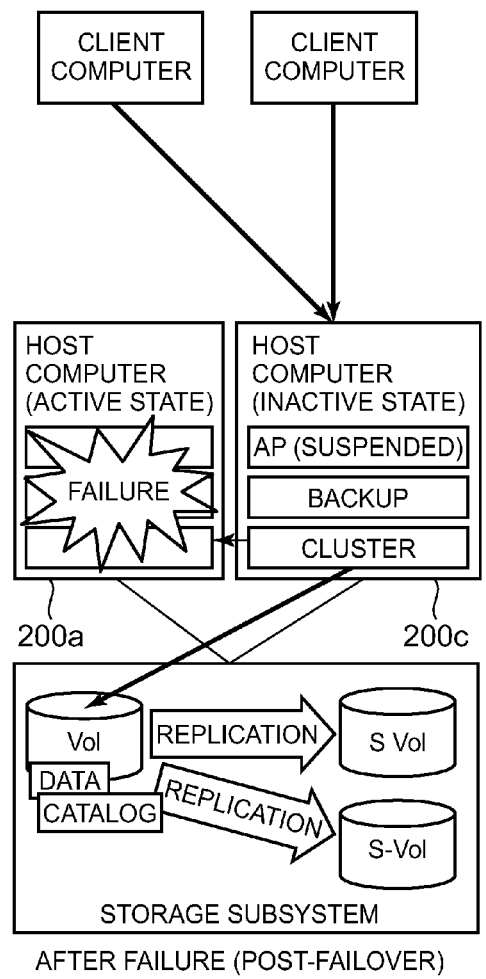

FIG. 1 is an example of a block diagram related to the configuration of a computer system of a first embodiment of the present invention.

The configuration is such that the computer system is divided into a primary site and a remote site where storage subsystems 1000 are provided, and the storage subsystem 1000 at each site is coupled to either one, two or more host computers 200. The host computer 200 is coupled to a client computer 250. A management computer 10 is coupled by way of a control line to the host computers 200 at the respective sites. Furthermore, in FIG. 1, the respective elements, i.e. the management computer, the host computer, and the storage subsystem, are divided up by site, and have been assigned the respective symbols a and b, but in a case where a particular symbol has not appended in the specification, it will be assumed to be an explanation of contents shared in common. Further, any number of host computers 200 and storage subsystems 1000 may be provided.

The host computer 200 and storage subsystem 1000 are coupled together via a data communication line 500.

Further, the data communication line 500 may be configured from one or more networks. In addition, the data communication line 500 may be either the data communication line 500 and the control line 55, or a communication line or network that is common to both.

Figure 3:
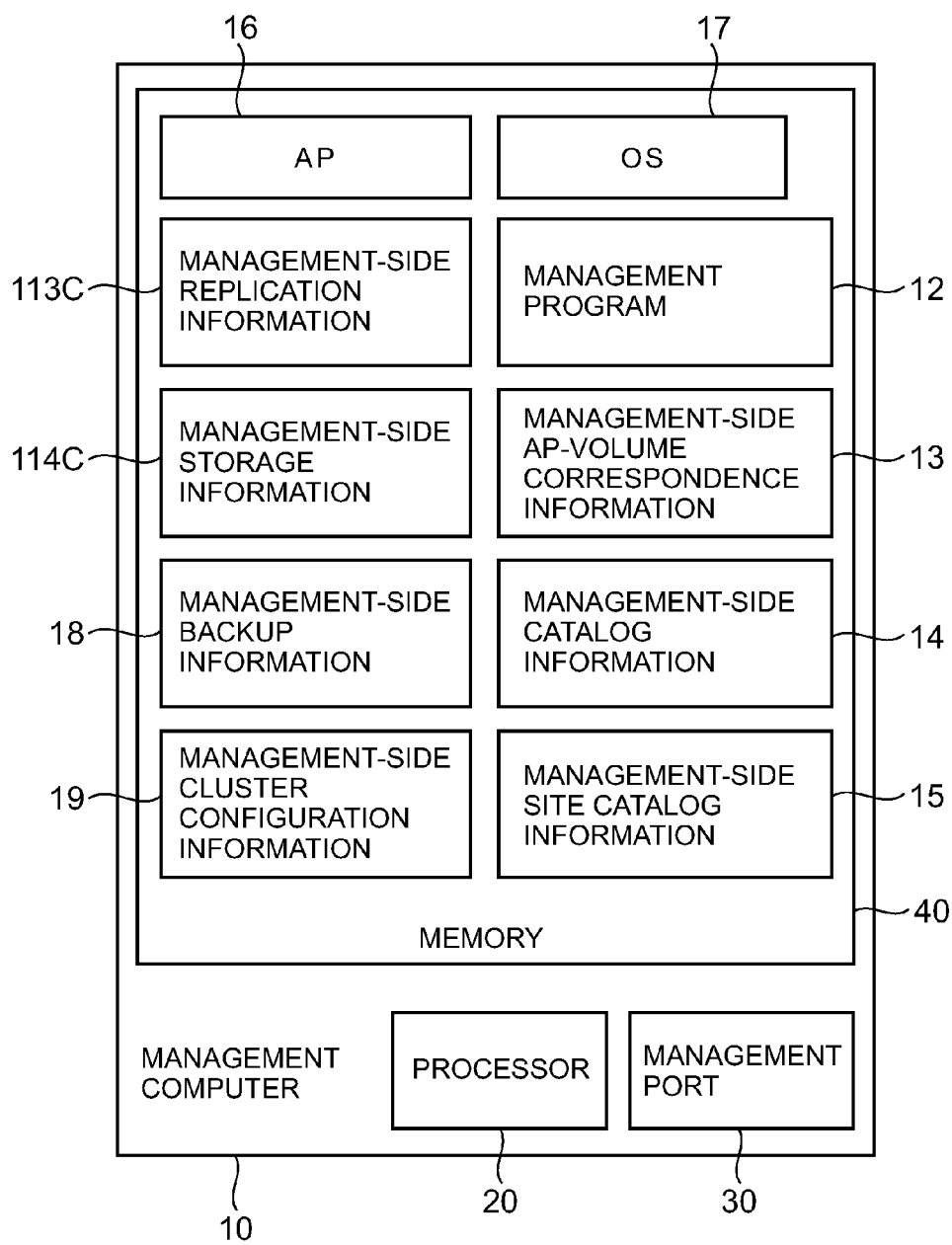
FIG. 3 is a detailed diagram of a management computer 10.

FIG. 3 shows the details of the management computer 10. The management computer 10 comprises a memory 40, a processor 20, and a management port 30. The memory 40, the processor 20 and the management port 30 are coupled together via an internal network (not shown in the drawing). Furthermore, the management computer 10 may be coupled to the host computer 200 and the storage subsystem 100 using a port other than the management port. Further, the memory 40 may be either a semiconductor memory and/or a disk device, or a combination of these. The memories of the host computer and the storage subsystem, which will be explained below, may also be either semiconductor memories and/or disk devices, or a combination of these.

The processor 20 performs a variety of processes in accordance with executing a program stored in the memory 40. For example, the processor 20 controls the host computer 200 by issuing the host computer 200 a backup control instruction.

The memory 40 stores a program that is executed by the processor 20, and information that the processor 20 requires. Specifically, the memory 40 stores a management program 12, management-side AP-volume correspondence information 13, management-side catalog information 14, management-side replication information 113C, management-side storage information 114C, management-side backup information 18, management-side cluster configuration information 19, and management-side site catalog information 15. The memory 40 also stores an AP program (hereinafter AP) 16 and an OS (Operating System) 17. The AP 16 is an application program for realizing various processing. For example, the AP 16 provides either a database function, a mail server function, or a WEB server function. The OS 17 is the program that controls the overall processing of the management computer 10.

The management program 12 is for centrally managing the storage subsystems 1000 and the host computers 200 at the plurality of sites (in the case of FIG. 1, the primary site and the remote site) via the control line 55.

The management-side AP-volume correspondence information 13 is for managing the host computers that are respectively located at the two sites (the primary site and the remote site), and the AP 211 running on these host computers. Furthermore, the AP-volume correspondence information 13 will be explained in detail using FIG. 12. The management-side catalog information 14 is for holding information related to data that has been backed up. The management-side catalog information 14 will be explained in detail using FIG. 10. The management-side site catalog information 15 is related to the backup data and the backup time. The management-side site catalog information 15 will be explained in detail using FIG. 11.

The management-side backup information 18 is for holding information required for a backup. The management-side backup information 18 will be explained in detail using FIG. 9.

The management-side cluster configuration information 19 is for managing the configuration of the cluster system. The management-side cluster configuration information 19 will be explained in detail using FIG. 13.

The replication information 113C is for managing the configuration and status of a replication. The replication information 113C is the explained in detail using FIG. 8.

The management-side storage information 114C is management information related to the storage subsystem 1000 managed by this management computer 10. The management-side storage information 114C creates one table for one storage subsystem 1000. The management-side storage information 114C will be explained in detail using FIG. 7.

The management port 30 is an interface that is coupled to the host computer 200 via the control line 55. The control line 55 may be configured from one or more networks. In addition, the control line 55 may be either the data communication line 550 and the data communication line 500, or a communication line or a network that is common to both. Further, the management computer 10 comprises an input/output device. A display, a keyboard, and a pointer device are possible examples of the input-output device, but a device other than these may also be used. Further, instead of an input/output device, a serial interface or an Ethernet interface may be used as an input/output device, and this interface may be coupled to a display computer comprising a display, or a keyboard, or a pointer device, and may substitute for the input and display of the input-output device by sending display information to the display computer and receiving input information from the display computer, and by carrying out a display on the display computer and receiving an input.

Below, an aggregation of one or more computers, which manages the computer system and displays the display information of the present invention, may be called a management system. In a case where the management computer displays the display information, the management computer is a management system, and a combination of the management computer and the display computer is also a management system. Further, to increase the speed and enhance the reliability of management processing, the same processing as that of the management computer may be realized using a plurality of computers, and in accordance with this, this plurality of computers (including the display computer in a case where the display computer performs the display) is a management system.

Figure 4:
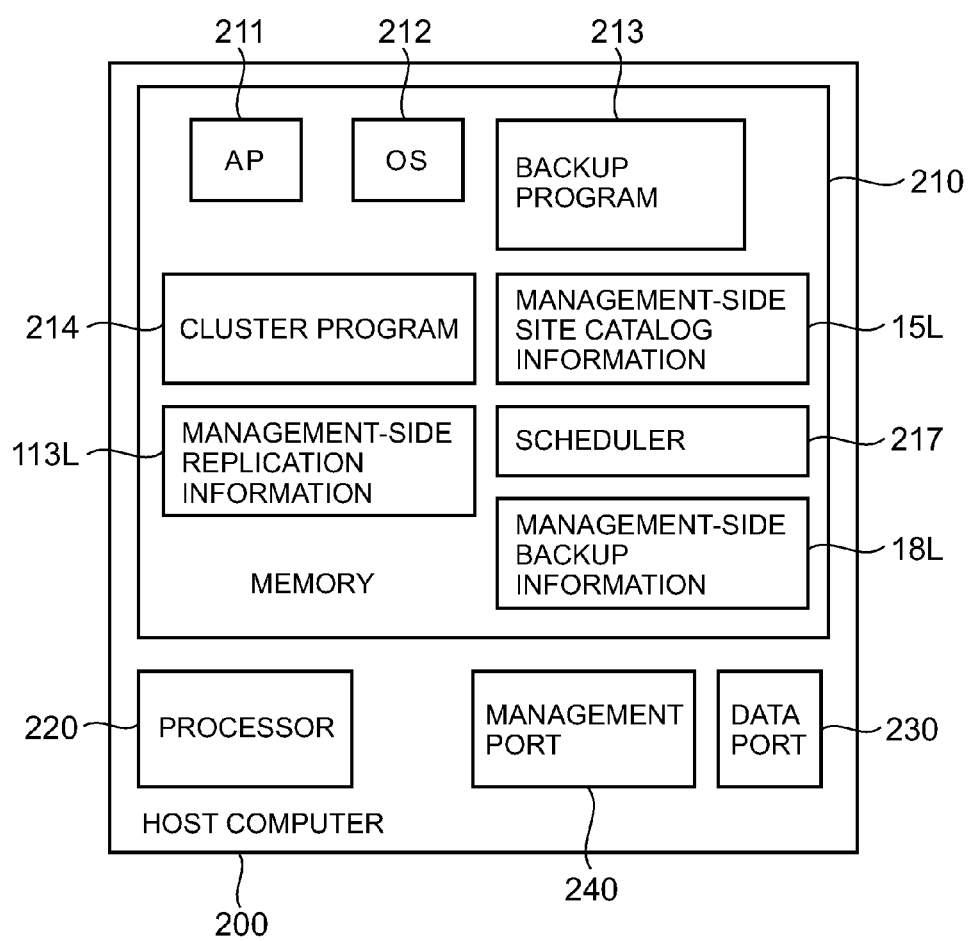
FIG. 4 is a detailed diagram of a host computer.

FIG. 4 shows the details of the host computer 200. The host computer 200 comprises a memory 210, a processor 220, a management port 240 and a data port 230.

The memory 210, the processor 220 and the data port 230 are coupled together via an internal network (not shown in the drawing).

The processor 220 realizes various processing by executing a program stored in the memory 210. For example, the processor 220 accesses one or more logical volumes (hereinafter, may simply be called a volume) Vol provided by the storage subsystem 1000 by sending an I/O request to this storage subsystem 1000.

The memory 210 stores a program that is executed by the processor 220, and information that the processor 220 requires. Specifically, the memory 210 stores an AP 211, an OS 212, a backup program 213, a cluster program 214, management-side site catalog information 15L, management-side backup information 18L, management-side replication information 113L, and a scheduler 217.

The AP 211 realizes various processing. AP is the abbreviation for Application Program. The AP 211 provides either a database function or a WEB server function. The OS 212 is the program that controls the overall processing of the host computer 200. The backup program 213 receives an instruction from the management computer, and implements processing in accordance with this instruction. The cluster program 214 implements cluster processing, which is explained below. The scheduler 217 is a program for executing a predetermined program at a predetermined time. In this embodiment, the scheduler 217 is disclosed as an independent program, but it may be one function of the OS 212.

The management-side site catalog information 15L relates to the backup data and backup time, and is a replication of the information by the same name held by the management computer 10. A detailed explanation of the management-side site catalog information 15L will be omitted since it is the same as the management-side site catalog information 15 of the management computer 10. In this specification, this information is described by appending an L at the end to distinguish it from the information of the same name in the management computer 10.

The management-side backup information 18L is for holding information required for a backup, and is a replication of the information of the same name held in the management computer 10. A detailed explanation of the management-side backup information 18L will be omitted since it is the same as the management-side backup information 18 of the management computer 10. In this specification, this information is described by appending an L at the end to distinguish it from the information of the same name in the management computer 10.

The management-side replication information 113L is for managing the configuration and status of a replication, and is a replication of the information of the same name held in the management computer 10. A detailed explanation of the management-side replication information 113L will be omitted since it is the same as the management-side replication information 114C of the management computer 10. In this specification, this information is described by appending an L at the end to distinguish it from the information of the same name in the management computer 10.

The data port 230 is an interface that is coupled to the storage subsystem 1000 via the data communication line 500. Specifically, the data port 230 sends an I/O request to the storage subsystem 1000.

The management port 240 is an interface that is coupled to the management computer 10 via the control line 55. Specifically, the management port 240 sends a control instruction to the management computer 10.

The host computer 200 may also comprise an input/output device. A display, a keyboard, and a pointer device are possible examples of the input-output device, but a device other than these may also be used. Further, instead of an input/output device, a serial interface or an Ethernet interface may be used as an input/output device, and this interface may be coupled to a display computer comprising a display, or a keyboard, or a pointer device, and may substitute for the input and display of the input-output device by sending display information to the display computer and receiving input information from the display computer, and by carrying out a display on the display computer and receiving an input. Further, the input/output devices of the host computer 200 and the management computer 10 do not have to be the same.

Next, the storage subsystem 1000 will be explained using FIG. 2.

The storage subsystem 1000a and the storage subsystem 1000b are coupled together via the data communication line 550. Further, the storage subsystem 1000 comprises a storage control apparatus 300 and a disk device 1500.

Furthermore, the data communication line 550 may be configured from one or more networks. In addition, the data communication line 550 may be either the data communication line 500 and the control line 55, or a communication line or network that is common to both.

The disk device 1500 is a disk-type storage media drive, and stores data that is read-requested from the host computer 200. Instead of the disk device 1500, another type of storage device (for example, a flash memory drive) may be used. The storage control apparatus 300 controls the entire storage subsystem 1000. Specifically, the storage control apparatus 300 controls the writing of data to the disk device 1500 and the reading of data from the disk device 1500. Further, the storage control apparatus 300 provides a storage area of the disk device 1500 to the host computer 200 as one or more logical volumes Vol. There may be a plurality of disk devices 1500.

The storage control apparatus 300 comprises a memory 1200, a cache memory 1100 (may be shared with the memory 1200), a storage port 1320, a management port 1330, and a processor 1310. Furthermore, in packaging the storage control apparatus 300, one or more of each of the above-mentioned hardware components (for example, the storage port 1320, the management port 1330, and the processor 1310) may reside on one or more circuit boards. For example, from the standpoints of enhancing reliability and improving performance, the storage control apparatus 300 may be made up of a plurality of units and each storage control apparatus 300 may comprise a memory 1200, a storage port 1320, and a processor 1310, and, in addition, may be a hardware configuration in which a cache memory 1100 is coupled to a plurality of control units. Furthermore, although not shown in the drawing, the storage control apparatus 300 comprises one or more backend ports, and the backend port is coupled to the disk device 1500. However, the storage control apparatus 300 may be coupled to the disk device 1500 in accordance with hardware other than the backend port.

The cache memory 1100 temporarily stores data to be written to the disk device 1500 and data that has been read from the disk device 1500.

The storage port 1320 is an interface that is coupled to the host computer 200 via the data communication line 500, and coupled to the other storage subsystem 1000 via the data communication line 550. Specifically, the storage port 1320 receives an I/O request from the host computer 200. Further, the storage port 1320 returns data read from the disk device 1500 to the host computer 200. In addition, the storage port 1320 sends and receives data that is exchanged between the storage subsystems 1000.

The management port 1330 is an interface that is coupled to the management computer 10 via the control line 55. Specifically, the management port 1330 receives a control instruction from the management computer 10. There are two types of control instructions here, i.e., a storage control instruction and a backup control instruction. The storage control instruction comprises a storage information report, a replication establishment instruction, a replication temporary suspend instruction, a resume replication instruction, a reverse replication instruction, and a replication status report instruction. The backup control instruction is an instruction for the backup program on the host computer 200. The backup control instruction comprises a volume information report instruction, an AP configuration information report, a backup status report, a register scheduler instruction, a refresh instruction, a register task scheduler instruction, a restore instruction, and a compound restore instruction.

The processor 1310 carries out a variety of processes in accordance with executing a program stored in the memory 1200. Specifically, the processor 1310 processes an I/O request received via the storage port 1320. The processor 1310 also controls the writing of data to the disk device 1500 and the reading of data from the disk device 1500. The processor 1310 sets a logical volume Vol based on the storage area of one or more disk devices 1500 in accordance with processing a program, which will be described below.

A program that is executed by the processor 1310 and information that is required by the processor 1310 is stored in the memory 1200. Specifically, the memory 1200 stores storage-side replication pair information 1210, a storage-side replication processing program 1230, volume information 1250, and an I/O processing program 1290.

The I/O processing program 1290 processes either a read request or a write request received from the host computer via the storage port. An overview of this processing is as follows:

In the case of a read request: This request specifies a logical volume, an address inside the logical volume, and a read length, and the I/O processing program 1290 reads the data from either the cache memory 1100 or the disk device 1500 in accordance with the specified content and sends this data to the host computer.

In the case of a write request: This request specifies a logical volume, an address inside the logical volume, and a write data length, and is associated with write data. The I/O processing program, after temporarily storing the write data in the cache memory 1100, writes the write data to the disk device corresponding to the specified content.

The hardware configuration of the storage subsystem 1000 has been described above, but the storage subsystem 1000a and the storage subsystem 1000b do not necessarily have to have the same hardware configuration.

Next, the programs and information stored in the memory 1200 will be explained.

The storage-side replication pair information 1210 is for managing a replication pair. The replication pair is a pair of two logical volumes Vol on the storage subsystem 1000 that is the target of a replication. The storage-side replication pair information 1210 will be explained in detail using FIG. 11.

The storage-side replication processing program 1230 carries out replication processing (an initial replication and regular replication). The replication process will be explained in detail using FIGS. 35 and 36.

The storage-side volume information 1250 is for managing the logical volume Vol that is provided in accordance with this storage subsystem 1000. The storage-side volume information 1250 will be explained in detail using FIG. 15. According to the configuration explained hereinabove, write data sent from the host computers 200a, 200b, 200c, 200d is stored in a logical volume Vol of the primary site storage subsystem 1000a (the primary storage subsystem). In a case where the computer system is a remote cluster, the write data stored in the logical volume Vol is transferred to the storage subsystem 1000b (the secondary storage subsystem) of the remote site in accordance with either a synchronous replication or an asynchronous replication by the primary storage subsystem, and the transferred write data is stored in a logical volume Vol of the secondary storage subsystem. In accordance with this, the data, which is the data of the logical volume Vol of the primary storage subsystem and which is the target of data duplication, can be made redundant, as a result of which, even in a case where the data of the logical volume Vol of the primary storage subsystem is lost, either host computer 200b or 200d is able to resume the prescribed processing using the replicated data stored in the logical volume Vol of the secondary storage subsystem.

(1-2) Overview of First Embodiment

Next, an overview of the first embodiment will be explained. Furthermore, the lack of an explanation for an item in this overview does not signify a waiver of rights with respect to this item.

First, a backup in a computer system that uses a local cluster (called a local cluster system hereinafter) in accordance with the present invention will be explained. FIG. 5 shows the configuration for a backup in the local cluster system. FIG. 5-1 is the configuration of the local cluster system in the normal state. In the local cluster, a plurality of host computers located at the same site share the logical volume Vol of the same storage subsystem. Sharing the logical volume is not limited to the above-mentioned plurality of host computers using this logical volume simultaneously, but does at a minimum signify that this plurality of host computers sends access requests specifying this logical volume. An access request comprises a read request and a write request.

In the local cluster system, the one of the host computers 200a and 200c is in the active state and the other is in the inactive state. The active-state host computer operates on at the least one or more application programs, which are running on this host computer, and provides an application program service to a client computer. Below, an application program targeted for control by the cluster system will be called a cluster-target application, and will be described simply as AP in the specification. Alternatively, the inactive-state host computer neither runs the cluster-target AP nor provides a service in accordance with the target AP to a client computer. The above-mentioned two host computers each monitor the status of the other host computer in preparation for a hardware or logical failure. Further, a backup is realized by the active-state host computer using a replication to copy and store data of a specified time created by the computer itself in the storage subsystem.

The reason the active-state host computer issues an instruction for a backup operation here is because it is necessary for quiescencing the AP (a procedure for suspending the operation of the AP for a short period of time so that the AP is able to recover the data of the backup-targeted logical volume) and for completing the local replication control for the local replication in a short period of time. In a case where the steps for the above-mentioned backup are not able to be completed in a short period of time, the so-called backup window (the time during which the AP is suspended for backup) increases and the AP performance deteriorates dramatically, giving rise to problems.

A case in which the active-state host computer 200a malfunctions for one reason or another will be considered here. In this case, as shown in FIG. 5-2, the cluster of the inactive-state host computer 200c detects that a failure has occurred in the active-state host computer 200a. Next, the inactive-state host computer 200c boots up the AP in order to take over the operation of the AP, changes its state from the inactive-state to the active state, and changes its network settings such that access from the client computer is switched to this host computer address. This change of network settings comprises preparing a virtual host identifier, such as either a virtual IP address or a host-name IP, and in a case where the host computer, which is in the active state, has changed, switching the host computer that corresponds to the virtual host identifier from the host computer that was originally in the active state to the host computer that has newly transitioned to the active state.

Furthermore, in a case where the method for this correspondence is a virtual IP address, there is a method in which the correspondence with the MAC address of the host computer Ethernet port is switched in accordance with ARP. In the case of a correspondence method that uses a virtual hostname, there is a method in which a DNS is operated and switches the host-name to the host computing period. The following explanation will be premised on a system that switches the virtual IP address and virtual host-name before or after a failure. Furthermore, in the premised system, the host computer having a virtual address will be called the virtual host computer so that the computer with the virtual address will be recognized by the client computer rather than the host computer 200. However, the present invention is not limited to the presupposed system. Even a different system (for example, an address switching system in accordance with a DNS operation) is able to treat the address of a virtual host computer handled by the present invention as an address to be switched before or after a failure.

The switchover of AP operations between host computers as described above will be called a failover process here.

There is a case where the failover process is triggered by a failure and a case where the failover process is triggered manually for test purposes. Further, a backup subsequent to the failover process is realized by the host computer 200c that becomes active following the failover process using a local replication to copy and store data of a specified point in time of the logical volume that this computer accesses subsequent to failover. Further, since the data that has been backed up by the active-state host computer subsequent to the failure is stored on the storage subsystem, the management-side catalog information, which consolidates the data storage logical volume Vol at the time of the backup and the log thereof, is also switched over during the active-inactive host computing period as a result of the failover. To realize this, the management-side catalog information of the backup catalog is also stored in the logical volume Vol on the storage subsystem the same as the AP data, and shared during this host computing period.

Figures 1, 6:
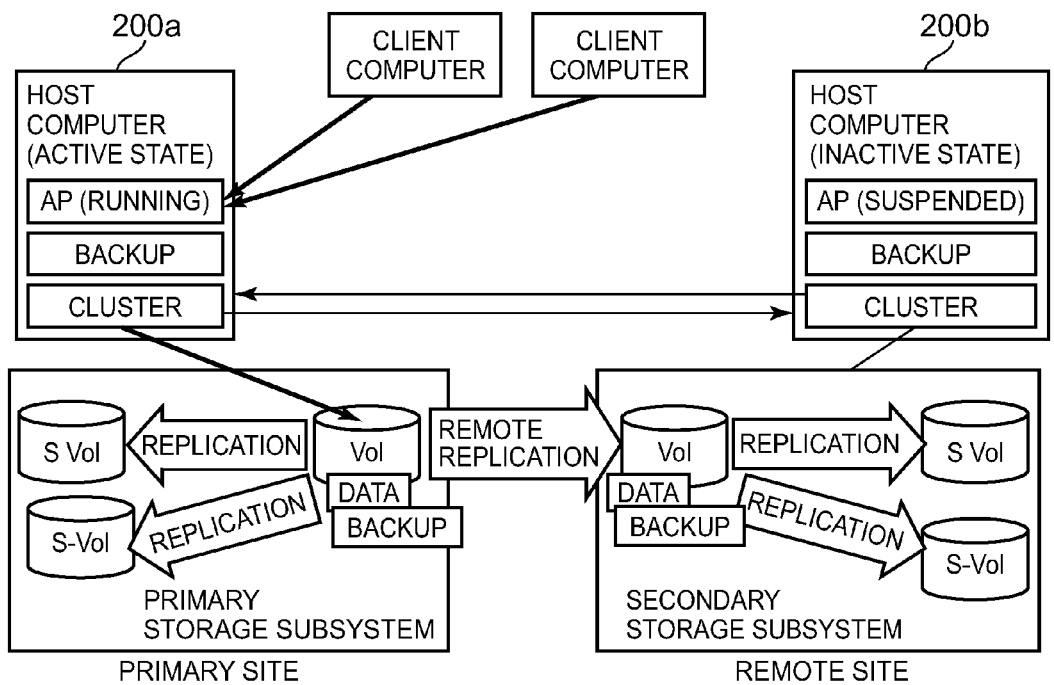
Figures 2, 6:
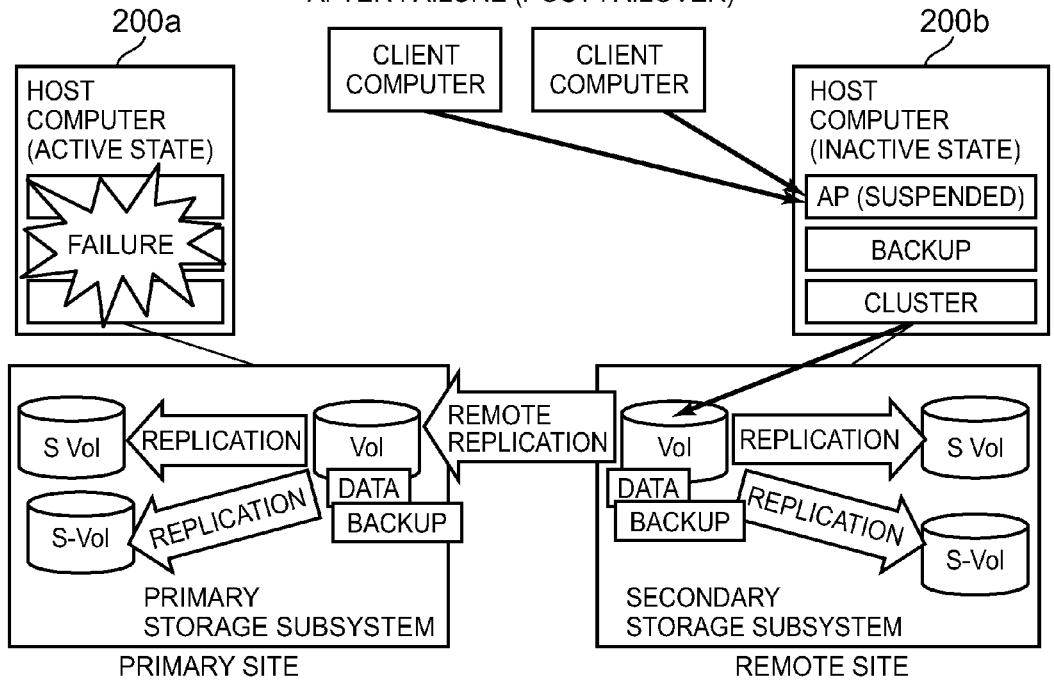

Next, a backup in a computer system that uses a remote cluster (hereinafter called a remote cluster system) will be explained. FIG. 6 shows the backup configuration in a remote cluster system.

FIG. 6-1 is the configuration of the remote cluster system in a normal state. The remote cluster system is a cluster configuration for accessing data on a logical volume Vol of storage subsystems having different host computers at the primary site and remote site, respectively. To enable the AP to perform the same processing between the host computers of the primary site and the remote site, the storage subsystems at both sites use remote replication to make the content of the data of the logical volumes Vol identical. In the remote cluster system as well, the one of the host computers 200a and 200b is in the active state and the other is in the inactive state. The active-state host computer operates on at the least one or more application programs (AP), which are running on this host computer, and provides an AP service to a client computer. A backup is realized by the active-state host computer 200a using a storage subsystem local replication to copy and store data of a specified time created by the computer itself.

As shown in FIG. 6-2, in order to achieve AP switchover at failover, the inactive-state host computer 200b boots up the AP and changes its status from the inactive state to the active state. Further, in order for the host computer 200b to access the data on the remote-site storage subsystem, which differs from the primary-site storage subsystem on which post-failover backup data is stored, it is not possible for the host computer to use the data backed up on the same storage subsystem as in the local cluster. However, it is possible to use the backup data by combining and controlling a remote replication and a local replication between the storage subsystems. This process will be described below. The management-side catalog information, which takes into account the fact that the logical volume Vol that is the backup data storage destination will differ before and after the failover, must be managed in order to realize the failover-triggered switchover during the active-inactive host computing period. Furthermore, examples of causes of a failover in the remote cluster configuration are a failure of the host computer that was in the active state, and also the failure of the storage subsystem that was accessed by the host computer that was in the active state. The fact that the remote cluster configuration is able to deal with these failures makes it different from the local cluster configuration.

As is clear here from FIGS. 5 and 6, the replication setting and mode required in the system and in a backup will differ in each of the local cluster system and the remote cluster system. This embodiment facilitates the setting of a replication configuration that differs in the local cluster system and in the remote cluster system. In a case where the local cluster and the remote cluster are simply described in this text as the cluster without distinguishing between the two will refer to the cluster in general without distinction between local and remote.

Furthermore, a replication for configuring a remote cluster and a replication for creating a backup in the present invention are analogous in that the data of the copy-source logical volume is replicated in the copy-destination logical volume, but they also differ in other respects. In the case of a replication for a remote cluster, the data of the copy-destination logical volume is made to resemble the data of the latest point in time of the copy-source logical volume as much as possible by either continuously or repeatedly carrying out data copy processing. In accordance with this, even in a case where the storage subsystem that provides the copy-source logical volume is damaged, it is possible to resume work by reducing to the extent possible the updated data that failed to be copied by using the copy-destination logical volume that has new data (or the same data as the copy-source logical volume) as much as possible. In a case where the copy-destination logical volume is used in an application like this (may be called disaster recovery use), typically one copy-destination logical volume corresponds to one copy-source logical volume. However, in a case where a replication is carried out to a plurality of storage apparatuses, called a multi-target system, there may be cases in which a plurality of logical volumes correspond to one copy-source logical volume.

Alternatively, in a case where a replication is utilized for backup use, the data of the copy-source logical volume of a prescribed point in time is created either physically or virtually in the copy-destination logical volume. In addition to using the backup data when recovering data that has been either lost or corrupted, the above-described replication is also able to cope with the type of failure that is communicated to the copy-destination logical volume by the copy process. An operational error or erroneous setting by the administrator, a virus infection, and a program malfunction are examples of this type of failure. More preferentially, the backup data is often used to create a plurality of generations.

Furthermore, in the case of backup use, there is also a technique called a logical snapshot for providing backup data virtually, and this technique may be employed as one means of creating backup data in this present invention. Further, in the case of backup use, the copy-source logical volume and the copy-destination logical volume need not exist in the same storage subsystem. In the explanations that follow, a replication for disaster recovery use will be called a remote replication, and a replication for backup use will be called a local replication to simplify the explanation.

Furthermore, in the following explanation, an AP executed on the host computer that is in the active state prior to a failover will be explained as corresponding to a single virtual host identifier. However, the correspondence between the AP and the virtual host identifier is not limited to this. For example, in a case where a plurality of APs are executed on the active-state host computer, a certain virtual host identifier may be allocated to a certain AP, and a different virtual host identifier may be allocated to another AP.

Furthermore, in the explanation that follows, "Replication" may be shortened to "REPLI".

Figure 7:
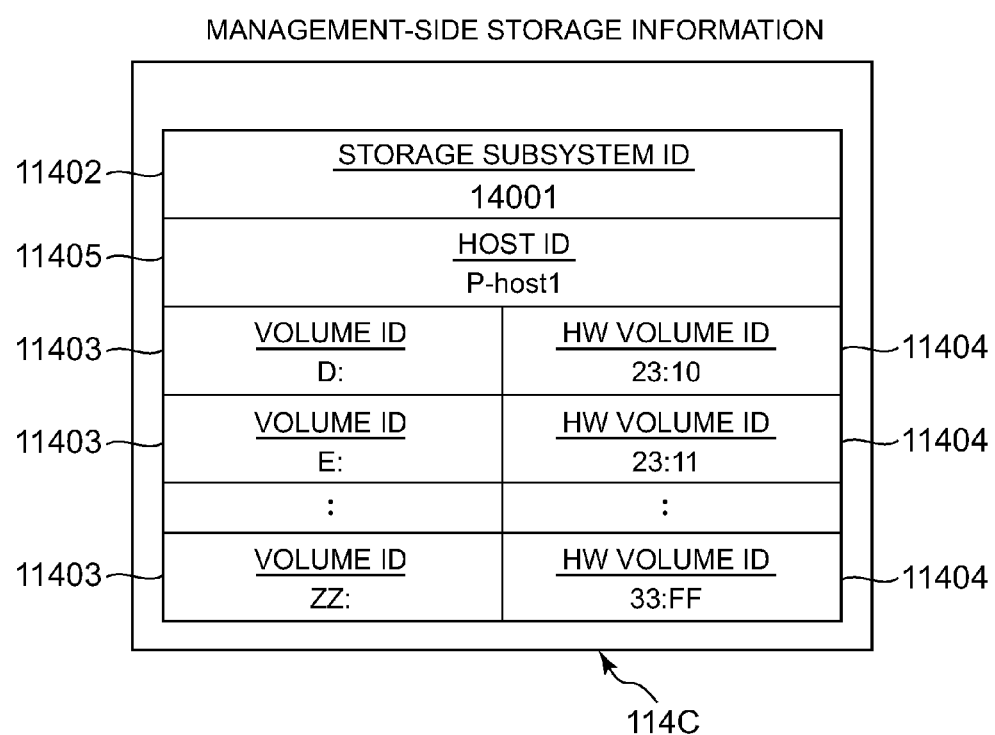
FIG. 7 shows an example of the configuration of management-side storage information 114C stored in the management computer 10.

(1-3) Information Handled by the Computer System of This First Embodiment (1-3-1) Management-Side Storage Information FIG. 7 is a diagram showing an example of the configuration of the management-side storage information 114C stored in the management computer 10. Furthermore, the management-side storage information 114C is a table created based on information acquired from the storage subsystem 1000, and the creation process will be explained below.

The management-side storage information 114C is a table showing the corresponding relationship between a logical volume Vol (volume ID) recognized by the host computer 200, and a logical volume Vol (HW volume ID) allocated by the storage subsystem, and comprises a storage subsystem ID 11402, a logical volume ID 11403, and a HW logical volume ID 11404.

The storage subsystem ID 11402 is the identifier of the storage subsystem 1000 that is managed by the management computer 10.

The host ID 11405 is the identifier used for uniquely identifying the host computer 200 in the computer system. In the case of a cluster, a virtual host computer may be provided to the client computer out of consideration for client computer couplability. A host ID is set in this host ID 11405.

The logical volume ID 11403 is a logical volume Vol identifier for the host computer to identify a logical volume Vol inside the storage subsystem 1000. Information such as 23:10 is stored in FIG. 7.

The HW logical volume ID 11404 is the identifier of a logical volume Vol that the storage subsystem 1000 provides and manages inside its own storage subsystem for use in the internal processing of the storage subsystem 1000 denoted by the storage subsystem ID 11402. Information such as 23:10 is stored in FIG. 7.

In the above explanation, the management-side storage information 114C was explained as information comprising a table structure, but this information may also be a data structure other than a table as long as this data structure makes it possible to specify the storage subsystem 1000 of each site, and the volume of this storage subsystem 1000.

In addition, the above-mentioned management-side storage information that consolidates a plurality of management-side storage information 114C may also be any data structure as long as this data structure makes it possible to specify the storage subsystem corresponding to each site, and the volume of this storage subsystem.

(1-3-2) Management-Side Replication Information

Figure 8:
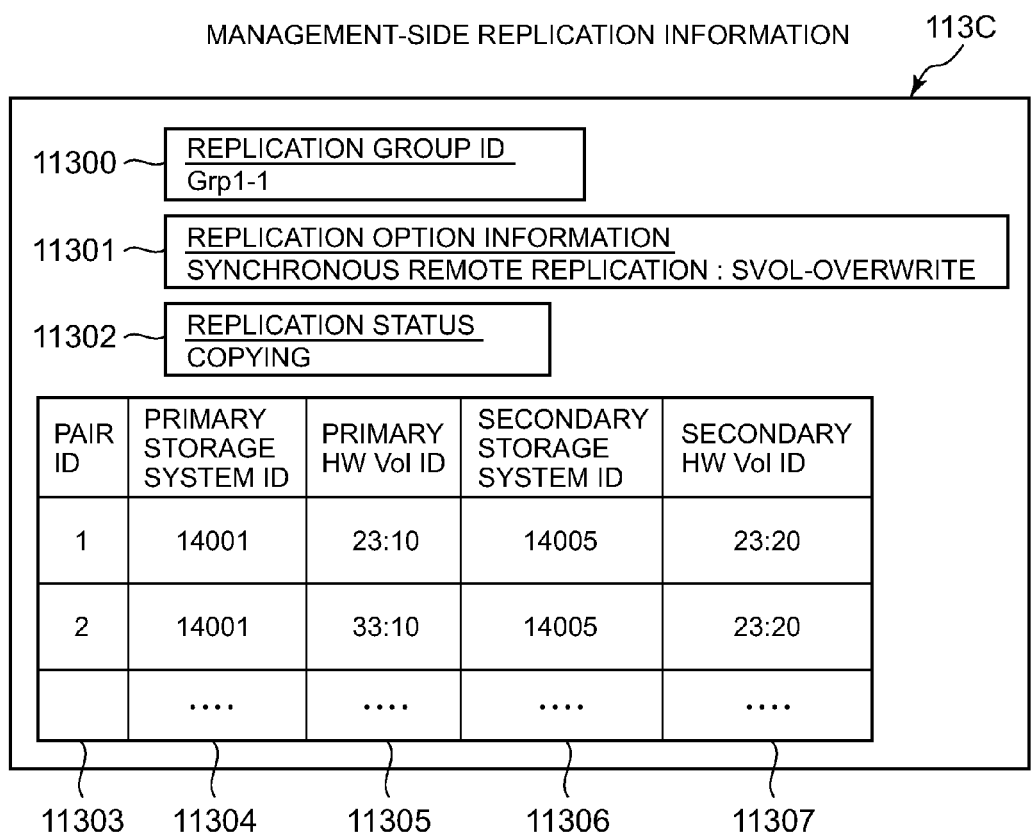
FIG. 8 shows an example of the configuration of management-side replication information 113C stored in the management computer 10.

FIG. 8 is a diagram showing an example of the configuration of the management-side replication information 113C stored in the management computer 10. Furthermore, the management-side replication information 113C is for managing a replication, and the management computer 10 uses this information to create two tables, i.e., a management-side storage information table 113A at the primary site and a management-side storage information table 113B at the remote site. This operation will be explained in detail below.

The management-side replication information 113C is a table that is created each time the management computer 10 establishes a replication, and a replication group ID (a replication group identifier) is assigned in this table for each request. The replication group is a set of a plurality of replication pairs.

The management-side replication information 113C comprises a replication group ID 11300, replication option information 11301, a replication status 11302, and replication configuration information 11303 to 11307.

The replication group ID 11300 is an identifier for managing a plurality of replication pairs by consolidating these pairs into a group.

The replication option information 11301 comprises a replication type and replication option information. The replication type is a function provided by the storage subsystem 1000. The replication type shows any of a local replication, a synchronous remote replication, or an asynchronous remote replication. For our purposes here, the replication type is broadly divided into the local replication and the remote replication. The remote replication is a replication carried out between different storage subsystems 1000, and in accordance with this, the replication source logical volume Vol (called the primary logical volume) and the replication destination logical volume Vol (called the secondary logical volume) exist separately in the storage subsystem 1000a and the storage subsystem 1000b.

The remote replication may also be either a synchronous remote replication or an asynchronous remote replication. The synchronous remote replication is a remote replication in which the timing of the replication process for making the contents of the primary logical volume and the secondary logical volume identical coincides with the writing of data by the host computer. The asynchronous remote replication is a remote replication in which the timing of the replication process for making the contents of the primary logical volume and the secondary logical volume identical does not coincide with the writing of data by the host computer. It is also possible to specify an option that has been provided for each replication type in the replication option information. The option information may include information denoting whether or not a write to the replication-destination logical volume Vol (the secondary logical volume) is possible during a temporary suspend of the remote replication. A temporary suspend of the remote replication is a temporary suspension of the remote replication resulting from a request from the management computer 10.

The replication status information 11302 shows the current status of a replication that is managed in accordance with this replication information 113. Specifically, for example, the replication status information 11302 indicates the status of the replication being managed in accordance with this replication information 113 to be any of not copied, copying, temporary suspend, pair status or abnormal status.

The replication configuration information comprises a pair ID 11303, a primary storage subsystem ID 11304, a HW volume ID 11305, a secondary storage subsystem ID 11306 and a secondary HW volume ID 11307.

The pair ID 11303 is an identifier that the management computer 10 assigns to a pair.

The primary storage subsystem ID 11304 is the identifier of the replication source (hereinafter, the primary side) storage subsystem (hereinafter, the primary storage subsystem) 1000a that provides the primary logical volume. The primary storage subsystem 1000a stores data from a site computer device 100a and from the host computer 200a.

The primary HW volume ID 11305 is the identifier of the primary logical volume that the primary storage subsystem 1000a provides for performing management inside its own storage subsystem.

The secondary storage subsystem ID 11306 is the identifier of the replication-destination (hereinafter, secondary side) storage subsystem 1000b (hereinafter, secondary storage subsystem) that provides the replication-destination secondary logical volume.

The secondary HW volume ID 11307 is the identifier of the secondary logical volume that the secondary storage subsystem 1000b provides for performing management inside its own storage subsystem.

Furthermore, the primary logical volume refers to the copy-source logical volume and the secondary logical volume refers to the copy-destination logical volume. A single storage system provides a plurality of logical volumes, and each of these volumes is individually able to become a primary logical volume and a secondary logical volume. Therefore, in the case of a primary storage subsystem, a primary logical volume is not the only logical volume that exists in this subsystem. The name primary storage subsystem is only allocated to simplify the explanation when the explanation focuses on a replication pair comprising a primary logical volume and a secondary logical volume that is the subject of the explanation. The same thing also applies to the term secondary storage subsystem.

The respective replication statuses have the following meanings.

Not copied status: Status indicating that copying has not begun.

Copying status: Status wherein the data of the primary logical volume is being copied to the secondary logical volume. In addition to transitioning to this status from the not copied status, there are also case where this status is transitioned to from either the temporary suspend status of the abnormal status.

Pair status: Status indicating that the data of the primary logical volume has been completely copied to the secondary logical volume, and that a process for reflecting write data for the primary logical volume in the secondary logical volume is being carried out. This status is transitioned to from the copying status. Furthermore, in the case of disaster recovery use, the recovery of an AP operation that uses the latest data is not possible unless the replication pair has transitioned to this status.

Temporary suspend status: Status wherein the reflection of write data in the pair status has been suspended, and data at the point in time when a primary logical volume reflection process was suspended to the secondary logical volume is stored. In a replication for backup use, such as the above-mentioned logical snapshot, the reflection process need not be suspended since the host computer may be provided with information to the effect that the secondary logical volume is virtually storing the data of the primary logical volume of a prescribed point in time. In addition, the write location for a write to either the primary logical volume or the secondary logical volume during this status may be recorded in accordance with a bitmap or the like. This write location information is for making it possible to reduce the copy amount by limiting a copy performed when the status has transitioned to the copying status to the location recorded in this information.

Abnormal status: Status indicating that a copy process has been suspended due to an abnormality resulting from a failure of some sort, for example, a failure of the storage subsystem or in the network between the storage subsystems. This status is transitioned to from either the copying status or the pair status. In this status, too, a write location record that uses write location information may be performed as was explained with respect to the temporary suspend status.

In the above explanation, the management-side replication information 113C was explained as information comprising a table structure, but this information may also be a data structure other than a table as long as the data structure comprises the correspondence between a replication group and one or more replication pairs, or the replication status of the replication group (or the replication pair), or the correspondence between the replication pair, the storage subsystem 1000, and the volume.

In addition, information that consolidates a plurality of management-side replication information 113C may be handled as replication information, and in this case as well, the replication information may be a data structure other than a table as long as the data structure comprises the correspondence between a replication group and one or more replication pairs, or the replication status of the replication group (or the replication pair), or the correspondence between the replication pair, the storage subsystem 1000, and the volume.

(1-3-3) Management-Side Backup Information

FIG. 9 is a diagram showing an example of the configuration of the management-side backup information 18 stored in the management computer 10.

The management-side backup information 18 holds a user-specified backup condition. The management-side backup information 18 comprises a backup ID 1801, a virtual host ID 1802, an AP 1803, a data1 1804, a data2 1805, and Backup columns (start 1807, interval 1808, protection period 1809). The backup ID 1801 is an identifier that the management computer 10 assigns to a backup target.

The virtual host ID 1802 is the host computer identifier. In the case of a cluster, a virtual host computer may be provided to the client computer out of consideration for client computer couplability. In this case, the virtual host ID is set in this virtual host ID 1802. In the case of no cluster, the normal host ID is stored in the ID 1802.

The AP 1803 is the identifier of the AP 211.

The data1 (1804) is the name of the data that the host computer 200 references while running the AP 211. In a case where the data of the AP 211 is configured in a plurality of hierarchies, the data name that is identified by the highest level hierarchy is stored.

The data2 (1805) is the data name identified by the second highest level hierarchy inside the hierarchical data that the host computer 200 references while running the AP 211.

This data2 is only stored in a case where the data of the AP 211 is configured in a plurality of hierarchies. The following embodiment is premised on the fact that there are two hierarchies of AP 211 data. However, in a case where there are three of more AP 211 data hierarchies, the present invention is applicable when information that stores the data name of these hierarchies is added corresponding to the number of these hierarchies.

The Backup column start 1807 stores a backup start time. The Backup column interval 1808 is the time interval at which a backup is acquired. The Backup column protection period 1809 is the period of time during which the backed up data is protected.

(1-3-4) Management-Side Catalog Information

FIG. 10 is a diagram showing an example of the configuration of the management-side catalog information 14 stored in the management computer 10. The management-side catalog information 14 holds information related to the backup data. The management-side catalog information 14 comprises a backup ID 1401, a Remote Cluster 1403, a replication group 1404, a host ID (from 1st to 2nd), and an active host ID 1407.

The backup ID 1401 is an identifier for identifying a backup.

The Remote Cluster 1403 shows whether or not the computer system is a remote cluster. In the case of a remote cluster, a replication group ID related to this host ID is also stored in the replication group ID 1404.

The 1st 1405 host ID stores the host ID. Similarly, the 2nd 1406 host ID stores a second host ID. In FIG. 10, only enough columns exist for a 2nd host ID, but there may be a 3rd host ID and more. As explained above, in the case of a cluster, the host computer may be virtualized, and in accordance with this, a third and subsequent host computer IDs corresponding to this virtual host computer will be stored in this host ID.

The active host ID 1407 specifies the active-state host computer in the cluster system.

(1-3-5) Management-Side Site Catalog Information

Figure 11:
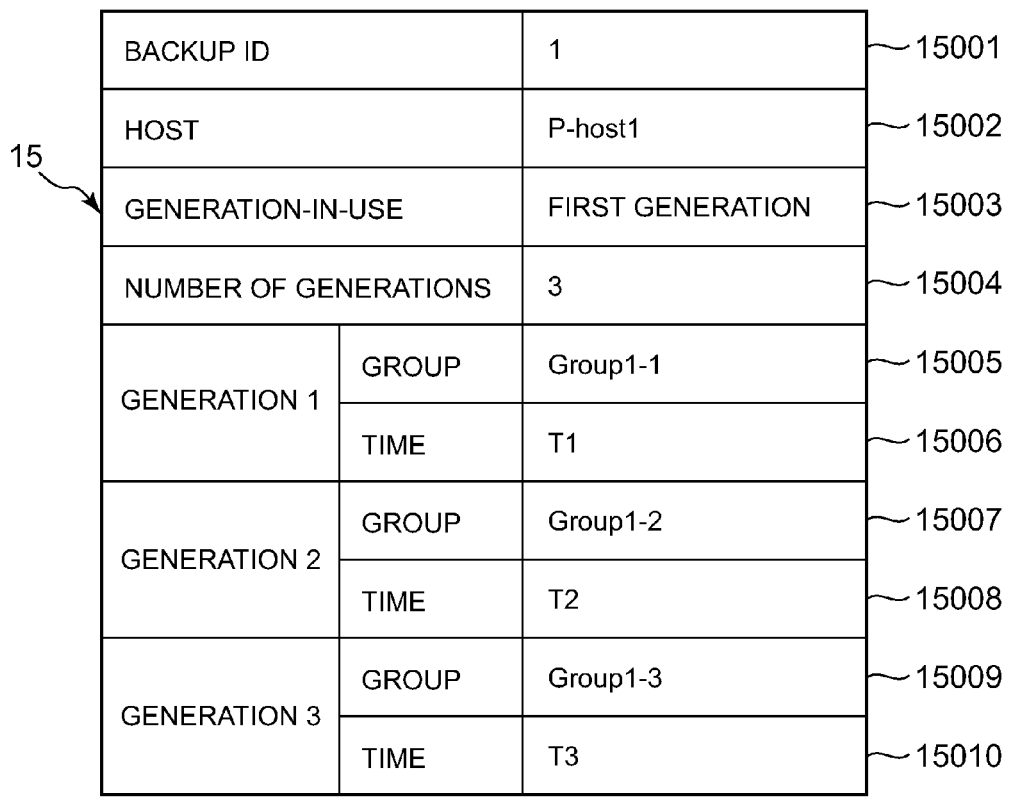
FIG. 11 shows an example of the configuration of management-side site catalog information 15 stored in the management computer 10.

FIG. 11 is a diagram showing an example of the configuration of the management-side site catalog information 15 stored in the management computer 10.

The management-side site catalog information 15 holds information related to a replication used in a backup and the backup time. The management-side site catalog information 15 comprises a backup ID 15001, a host ID 15002, a generation-in-use 15003, a number of generations 15004, a first generation group 15005, a first generation time 15006, a second generation group 15007, a second generation time 15008, a third generation group 15009, and a third generation time 15010.

The backup ID 15001 is an identifier that the management computer 10 assigns to a backup target.

The host ID 15002 stores the host ID.

The generation-in-use 15003 specifies the replication group that is being used in the current backup.

The number of generations 15004 shows the number of replication generations used in the same backup target. The replication generation denotes the number of replication groups with common replication-source data and different replication destinations. Providing a generation to a replication makes it possible to make a plurality of replications of the same data at different times. That is, in a case where the replication generation number is 3, this specifies that the backup-targeted data has been backed up at three different times in the same storage subsystem.

Next, first generation (group 15005, time 15006) to third generation (groups 15009, time 15010) show by generation the relationship between the backup acquisition time and the replication group in which this backup is stored. As described above, this information exists from 15005 to 15010. Of course, it goes without saying that the present invention is also applicable for backup generations beyond the third generation.

(1-3-6) Management-Side AP-Volume Correspondence Information

FIG. 12 is a diagram showing an example of the configuration of the management-side AP-volume correspondence information 13 stored in the management computer 10.

The management-side AP-volume correspondence information 13 is for managing the corresponding relationship between the data, which is handled by the backup-target application program (AP) running on the host computer, and the logical volume Vol in which this data is to be arranged. The management-side AP-volume correspondence information 13 comprises a host ID 13001, a virtual host ID 13002, an application name 13003, a data1 (13004), a data2 (13005) and a volume ID 13006.

The host ID 13001 is the identifier of the host computer 200. In the case of a cluster, a virtual host computer may be provided to the client computer out of consideration for client computer couplability. In this case, a virtual host ID is set in this host ID 13001. In the case of no cluster, a normal host ID is stored in the ID 13001.

The virtual host ID 13002 is the identifier of the virtual host computer that is set in the cluster-target host computer. The virtual host ID 13002 is used in the case of a cluster environment.

The application name 13003 is the name of the AP 211 that is running on this host computer 200.

The data1 (13004) is the name of the data that the host computer 200 references while running the AP 211. In a case where the AP 211 data is configured in a plurality of hierarchies, the data name of the highest level hierarchy is stored.

The data2 (13005) is the data name of the second highest level hierarchy within the hierarchical data that the host computer 200 references while running the AP 211. This data2 is only stored in a case where the AP 211 data is configured in a plurality of hierarchies.

The volume ID 13006 is the identifier of the logical volume Vol that stores the AP 211 data, and is the logical volume Vol identifier that this host computer 200 uses to identify the logical volume Vol inside the storage subsystem 1000.

(1-3-7) Management-Side Cluster Configuration Information

FIG. 13 is a diagram showing an example of the configuration of the management-side cluster configuration information 19 that is stored in the management computer 10.

The management-side cluster configuration information 19 is for managing the cluster configuration of this computer system. The management-side cluster configuration information 19 comprises a virtual host ID 19001, a Remote Cluster 19002, and host IDs (1st 19003, 2nd 19004).

The virtual host ID 19001 is the identifier of the virtual host computer set in the cluster-target host computer 200.

The Remote Cluster 19002 shows whether or not the computer system is a remote cluster. In the case of a remote cluster, a replication group ID related to this host ID is also stored in the replication group ID 1404.

A host ID corresponding to the above-mentioned virtual host computer is stored in the 1st 19003 host ID. Similarly, a second host ID corresponding to the above-mentioned virtual host computer is stored in the 2nd 19004 host ID. FIG. 13 shows an example in which there are two host computers, but the present invention is not limited to two host computers. For example, in the case of three hosts, a 3rd information column is added to the host ID. Of course, there may also be more or less than three hosts that provide a single virtual host in the present invention.

(1-3-8) Storage-Side Replication Pair Information

FIG. 14 is a diagram showing an example of the configuration of the storage-side replication pair information 1210 stored in the storage subsystem 1000 of the first embodiment of the present invention.

The storage-side replication pair information 1210 comprises a replication pair ID 12101, a volume ID 12102, replication status information 12103, a replication-target storage subsystem ID 12104, a replication-target volume ID 12105, a replication type 12106 and a replication group ID 12107.

The replication pair ID 12101 is the identifier of the replication pair that comprises the logical volume Vol identified by the logical volume ID 12102 and the logical volume Vol identified by the replication-target volume ID 12105. Specifically, the pair ID 11303 of the above-described replication information 113 is registered.

The volume ID 12102 is the identifier of the logical volume Vol that is provided by the storage subsystem 1000 storing this replication pair information 1210.

The replication status information 12103 shows the current status of the replication with respect to the logical volume Vol that is identified by the logical volume ID 12102. Specifically, the replication status information 12103 shows that the status of the replication pair specified by this replication pair ID is any of not copied, copying, temporary suspend or abnormal.

The replication-target storage subsystem ID 12104 is the identifier of the storage subsystem 1000, which provides the replication-destination logical volume Vol that forms the replication pair with logical volume Vol identified by the logical volume ID 12102. That is, the secondary storage subsystem 1000 identifier is stored in the replication-target storage system ID 12104.

The replication-target volume ID 12105 is the identifier of the logical volume Vol that forms the replication pair with the logical volume Vol identified by the logical volume ID 12102. That is, the identifier of the secondary logical volume, which is the replication destination of the data that is stored in the logical volume Vol identified by the logical volume ID 12102, is stored in the replication-target volume ID 12105.

The replication type ID 12106 is a function provided by the storage subsystem 1000, and shows that the replication is any of a synchronous remote replication, an asynchronous remote replication, or a local replication.

The replication group ID 12107 is the identifier of the replication group of the replication pair identified by the replication pair ID 12101. The storage subsystem 1000 manages a replication group comprising one or more replication pairs. For this reason, the management computer 10 is able to specify a replication group and to request a temporary suspend, resume or delete of a remote replication in the batch mode for the replication pairs included in the group.

In the above explanation, the replication pair information 1210 has been explained as information comprising a table structure, but this information may also be a data structure other than a table as long as the data structure comprises the correspondence between a replication pair and the replication group, the correspondence between the replication pair and the storage volume, and the replication type and replication status of the replication pair.

Further, the replication pair information 1210a of the storage subsystem 1000a and the replication pair information 1210b of the storage subsystem 1000b do not necessarily have to be the same data structure or the same data.

(1-3-9) Storage-Side Volume Management Information

FIG. 15 is a diagram showing an example of the configuration of the storage-side volume management information 1250 stored in the storage subsystem 1000 of the first embodiment of the present invention.

The storage-side volume management information 1250 comprises a logical volume ID 12501, volume status information 12502, a capacity 12503, a replication pair ID 12504, and a group ID 12505.

The logical volume ID 12501 is the identifier of the logical volume Vol provided by the storage subsystem 1000 that stores this volume management information 1250.

The volume status information 12502 shows the current status of the logical volume Vol identified by the logical volume ID 12501. Specifically, at the least one status from among primary logical volume, secondary logical volume, normal, abnormal or unpackaged is stored in the volume status information 12502.

For example, in a case where the logical volume Vol identified by the logical volume ID 12501 is the primary logical volume, "primary logical volume" is stored in the volume status information 12502. Further, in a case where the logical volume Vol identified by the logical volume ID 12501 is the secondary logical volume, "secondary logical volume" is stored in the volume status information 12502. Furthermore, the primary logical volume denotes the volume that is the replication source of the remote replication, and the secondary logical volume denotes the volume that is the replication destination of the remote replication.

Further, in a case where the host computer 200 is able to normally access the logical volume Vol identified by the logical volume ID 12501, "normal" is stored in the volume status information 12502. Further, in a case where the host computer 200 is not able to normally access the logical volume Vol identified by the logical volume ID 12501, "abnormal" is stored in the volume status information 12502. For example, "abnormal" is stored in the volume status information 12502 at the time of a disk device 1500 malfunction or a replication failure.

Further, in a case where data is not stored in the logical volume Vol identified by the logical volume ID 12501, "unpackaged" is stored in the volume status information 12502.

The capacity 12503 is the capacity of the logical volume Vol identified by the logical volume ID 12501. The replication pair ID 12505 is the unique identifier of the replication pair comprising the logical volume Vol identified by the logical volume ID 12501.

The replication pair ID 12504 is the identifier of the replication pair related to the logical volume ID 12501. Specifically, the pair ID 11303 of the replication information 113 explained using FIG. 6 is stored here.

The replication group ID 12505 is the identifier of the replication group of the replication pair ID 12504. The replication group ID provided in the replication information table 113 created each time the management computer 10 requests a replication is stored here.

In the above explanation, the storage-side volume management information 1250 has been explained as information comprising a table structure, but this information may also be a data structure other than a table as long as the data structure comprises the logical volume Vol status and capacity. Further, this information may also comprise the correspondence between the logical volume Vol and the replication pair, or the correspondence between the logical volume Vol and the replication group.

Further, the volume management information 1250a of the storage subsystem 1000a and the volume management information 1250b of the storage subsystem 1000b do not necessarily have to be the same data structure or the same data.

(1-4) Information Creation Process of Computer System of First Embodiment

The processing operations of the computer system of the first embodiment will be explained below. Furthermore, in this embodiment, it is supposed that the settings required in the cluster system are implemented in the host computer 200. However, it is supposed that a remote replication is not established in a remote cluster, and that the cluster program on the host computer 200 is in the suspend status.

(1-4-1) Management-Side Storage Information Creation Process

First of all, the creation process of the management-side storage information 114C will be explained. The management computer 10 creates this information based on the management program 12.

Figure 16:
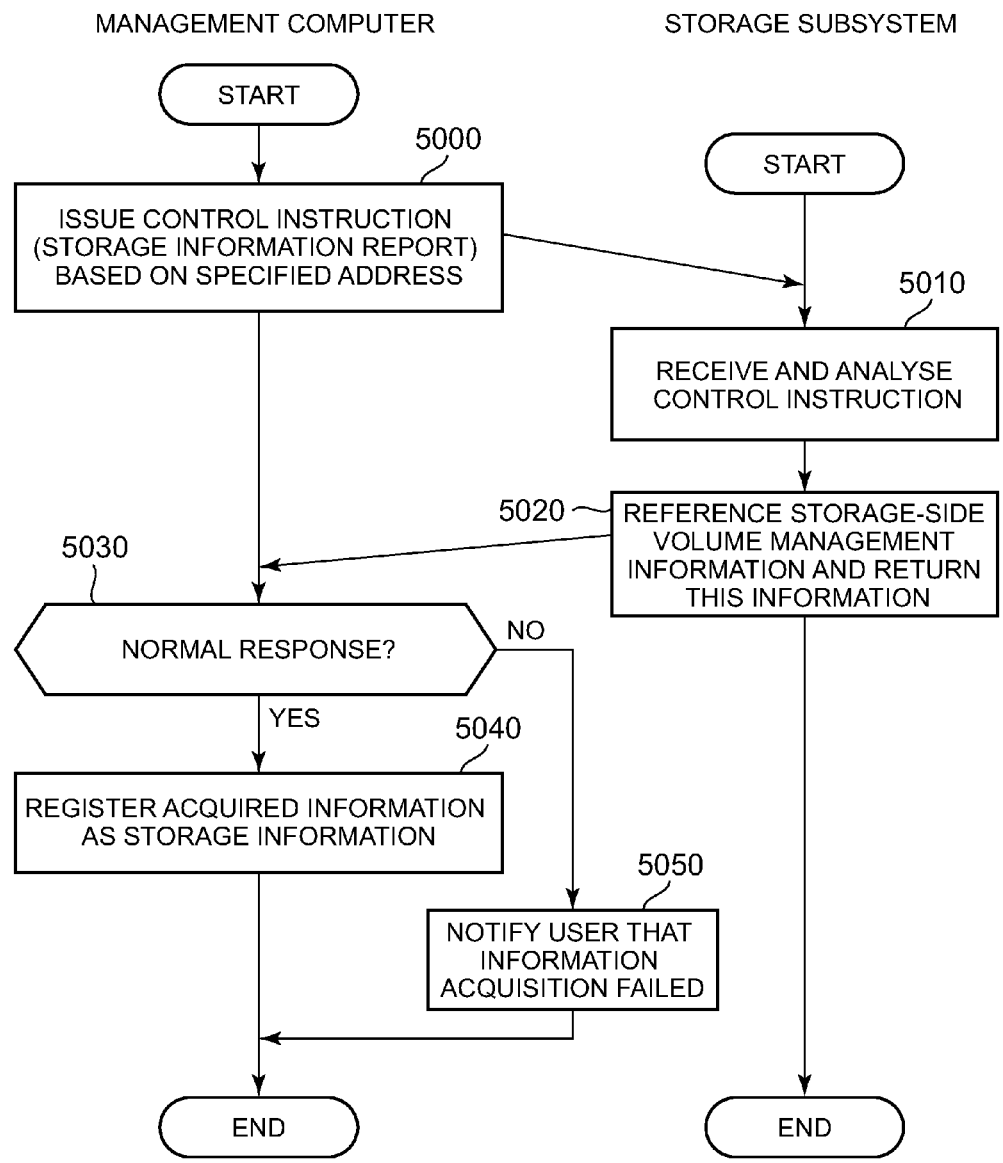
FIG. 16 is the flow of processing by which the management computer 10 creates management-side storage information 114C related to the storage subsystem 1000.

FIG. 16 is the flow of processing by which the management computer 10 creates management-side storage information 114C related to the storage subsystem 1000.

The management computer 10 receives either an address or a storage subsystem ID from the user. The management computer 10 issues a storage control instruction based on the received address (Step 5000).

Next, the storage subsystem 1000, upon receiving the control instruction sent in Step 5000, analyzes the contents of this instruction (Step 5010).

Next, the storage subsystem 1000 references the storage-side volume management information 1250 in the memory 1200 on the basis of the analyzed contents, and returns the contents of this management information as a response to the above-mentioned control instruction (Step 5020). The contents of this management information comprise a HW logical volume ID, volume status information, and a capacity. The storage subsystem ID here may be a network address (for example, an IP address) or an ID such as a hardware product number. However, in the case of the hardware product number, this hardware product number is included in the above-mentioned management information.

The management computer 10, upon receiving the control instruction response from the storage subsystem 1000, analyzes the contents thereof and determines whether or not these contents are normal (Step 5030).

In a case where the control instruction response from the storage subsystem 1000 is normal (Step 5030: YES), the management computer 10 creates the management-side storage information 114C. Since the host ID 11405 and the volume ID 11403 are information that is unavailable in the storage subsystem at the time of creation, these columns are left blank.

Alternatively, in a case where the control instruction response from the storage subsystem 1000 is not normal (Step 5030: NO), the management computer 10 notifies the user that a storage subsystem does not exist at the specified address.

(1-4-2) Process for Creating Management-side Cluster Configuration Information

Next, the process for creating management-side cluster configuration information will be explained. The management computer 10 creates this information based on the management program 12.

Figure 17:
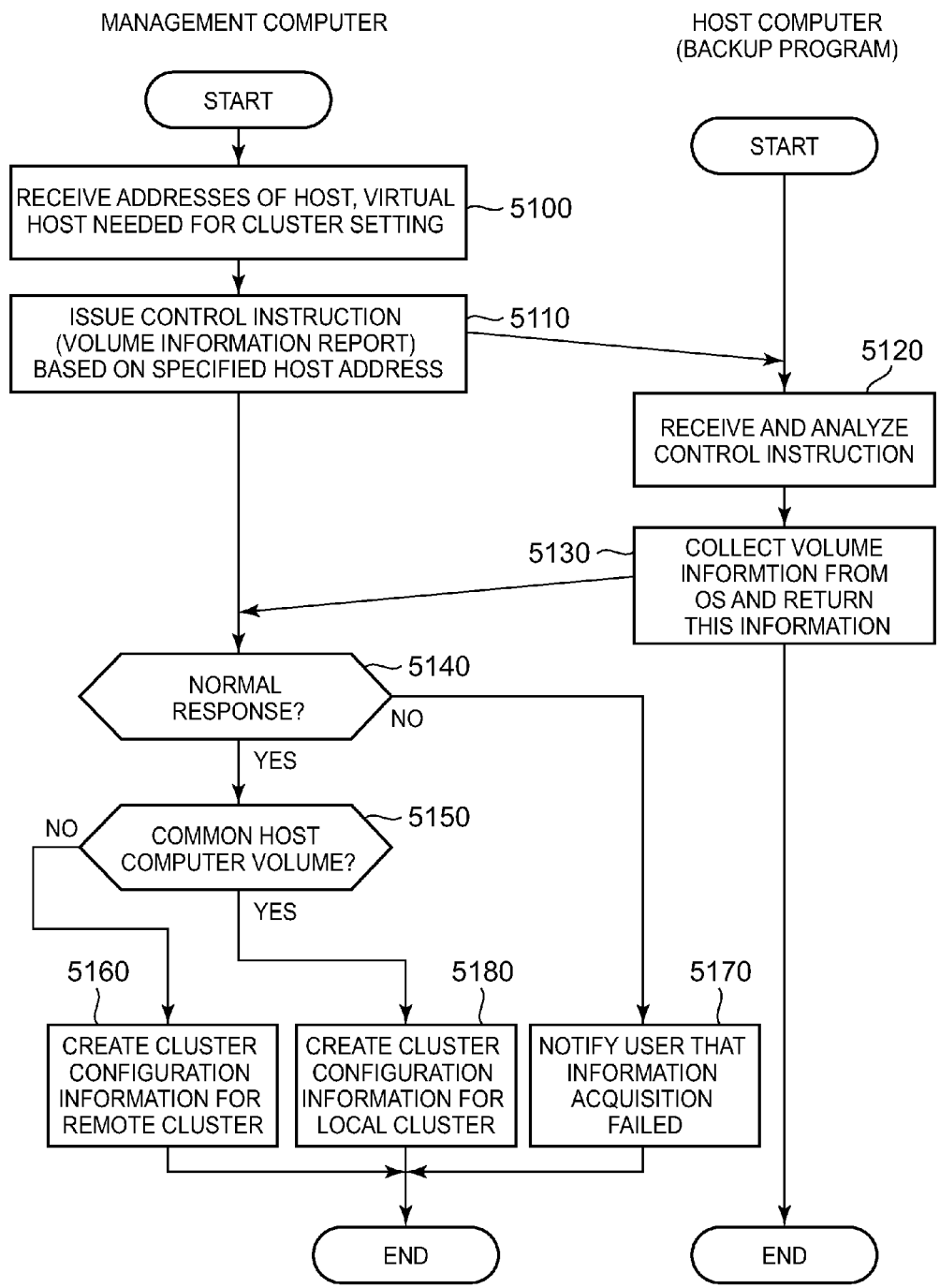
FIG. 17 is the flow of processing by which the management computer 10 creates the management-side cluster configuration information 19 using the cluster system management information.

FIG. 17 is the flow of processing by which the management computer 10 creates the management-side cluster configuration information 19 using the cluster system management information.

Figure 18:
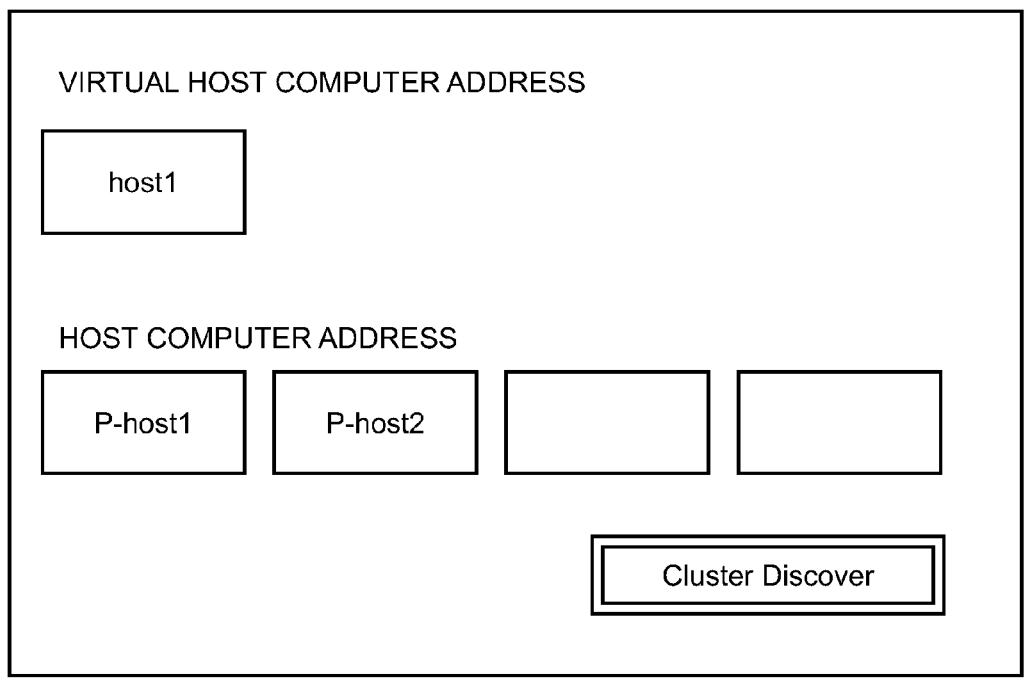
FIG. 18 is an example of a screen by which the management computer 10 acquires cluster system configuration information.

The management computer 10 receives the address of the host computer required for managing the cluster system and the address of the virtual host computer corresponding to this host computer from the user via a terminal or other such input screen (Step 5100). This address is either the host computer network address or the network host name here, and in this specification is handled the same as the host ID. Normally, in the case of a cluster system, a plurality of host computers correspond to a single virtual host computer. FIG. 18 shows an example of the input screen. In FIG. 18, two host computers (addresses "P-host1" and "P-host2") are inputted for the virtual host computer of the address "host1".

Next, the management computer 10 creates a backup control instruction (a volume information report) using the address inputted from the user as the instruction destination, and issues this instruction to the host computer 200 (Step 5110). For example, since two host computers are specified in the input of FIG. 18, the management computer 10 issues the backup control instruction to two different host computers.

The host computer 200, upon receiving this instruction, analyzes the content of this instruction (Step 5120), and next, acquires from the OS 212 the volume information managed by this OS. The volume information obtained from this OS comprises the volume ID and HW volume ID of all the volumes managed by this OS, and the ID of the storage subsystem in which this HW volume exists. Next, the host computer 200 creates a response to the backup control instruction that includes this volume information, and returns this response to the management computer 10 (Step 5130).

The management computer 10, upon receiving the backup control instruction response from the host computer 200, analyzes the content thereof and determines whether or not it is a normal response (Step 5140).

In a case where the host computer 200 response is normal (Step 5140: YES), the management computer 10 determines whether or not there is a common combination among the combinations of storage subsystem ID and HW logical volumes obtained from the responses of all the host computers 200 (Step 5150).

In a case where a combination of the storage subsystem ID and the HW logical volume are common to a combination obtained from the response of another host computer (Step 5150: YES), the management computer 10 determines that the cluster system is a local cluster, and creates the management-side cluster configuration information 19 on the basis of this determination (Step 5180). Specifically, the management computer 10 sets the Remote Cluster 19002 of the management-side cluster configuration information 19 to "No", and, in addition, creates the management-side cluster configuration information 19 comprising the virtual host computer address of the user input information in the virtual host ID 19001 and one or more host computer addresses. Next, to clarify the corresponding relationship between the host computer inputted in Step 5100 and the storage subsystem, volume ID and HW volume ID obtained from the above-mentioned response (will be called E2E information), the management computer 10 fills in the blank portions (the volume ID and the host ID) with the content of the above E2E information in which the storage subsystem ID and the HW volume ID of the created management-side storage information 114C of FIG. 16 are identical.

In a case where the combinations of the storage subsystem ID and the HW logical volume all differ from the combinations obtained from the responses of the other host computers (Step 5150: NO), the management computer 10 determines that the cluster system is a remote cluster, and creates the management-side cluster configuration information 19 in which the Remote Cluster 19002 is set to Yes (Step 5160). Next, to clarify the host computer inputted in Step 5100 and the E2E information obtained from the above response, the management computer 10 fills in the blank portions (the volume ID and the host ID) with the content of the above E2E information in which the storage subsystem ID and the HW volume ID of the created management-side storage information 114C of FIG. 16 are identical.

(1-4-3) Management-Side AP-Volume Correspondence Information

Next, the process for creating the management-side AP-volume correspondence information will be explained. The management computer 10 creates this information based on the management program 12.

Figure 19:
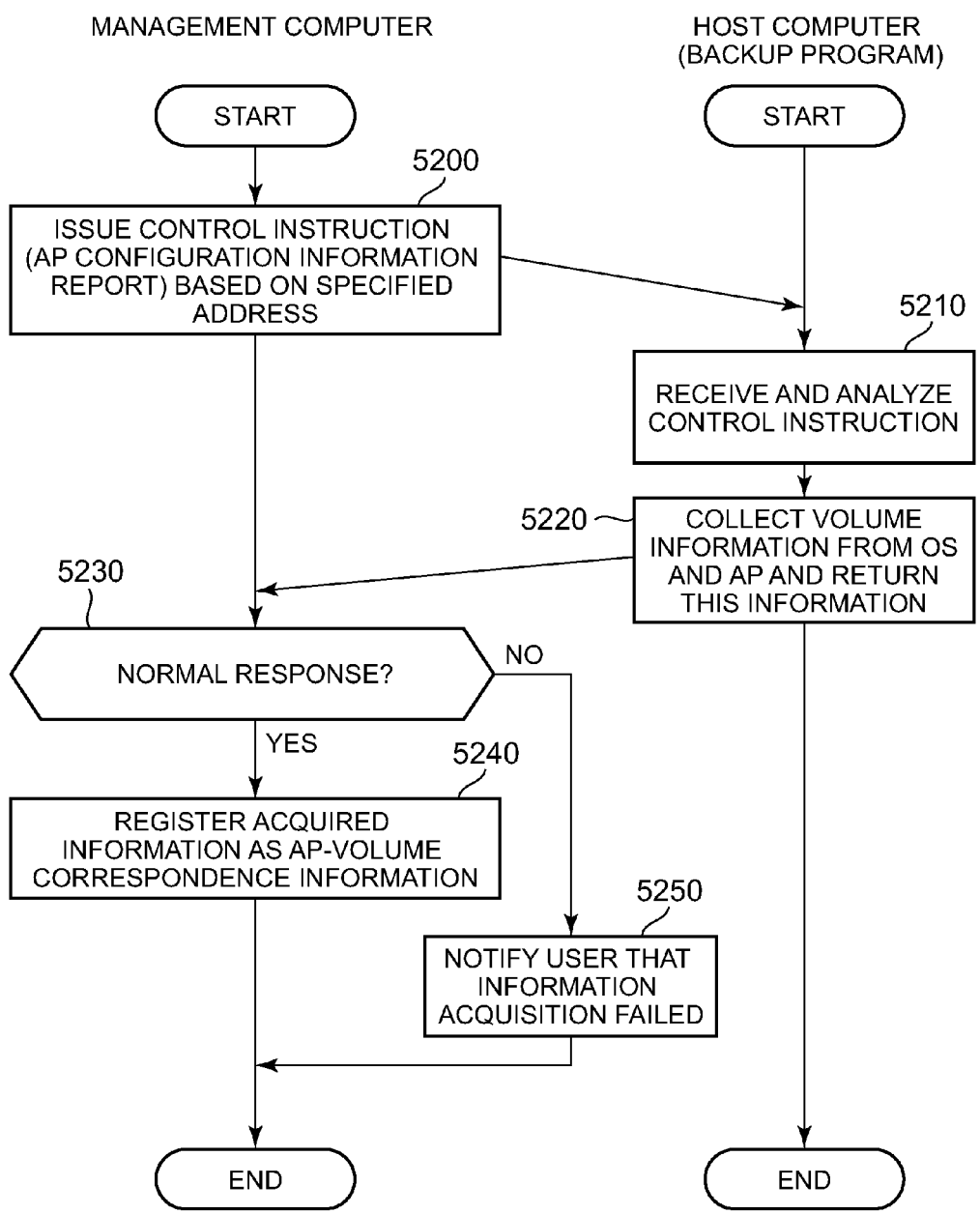
FIG. 19 is the flow of processing by which the management computer 10 creates the management-side AP-volume correspondence information 13 for correspondingly managing an AP running on the host computer 200 and the volume that this AP uses.

FIG. 19 is the flow of processing by which the management computer 10 creates the management-side AP-volume correspondence information 13 for correspondingly managing an AP running on the host computer 200 and the volume used by this AP.

Figure 20:
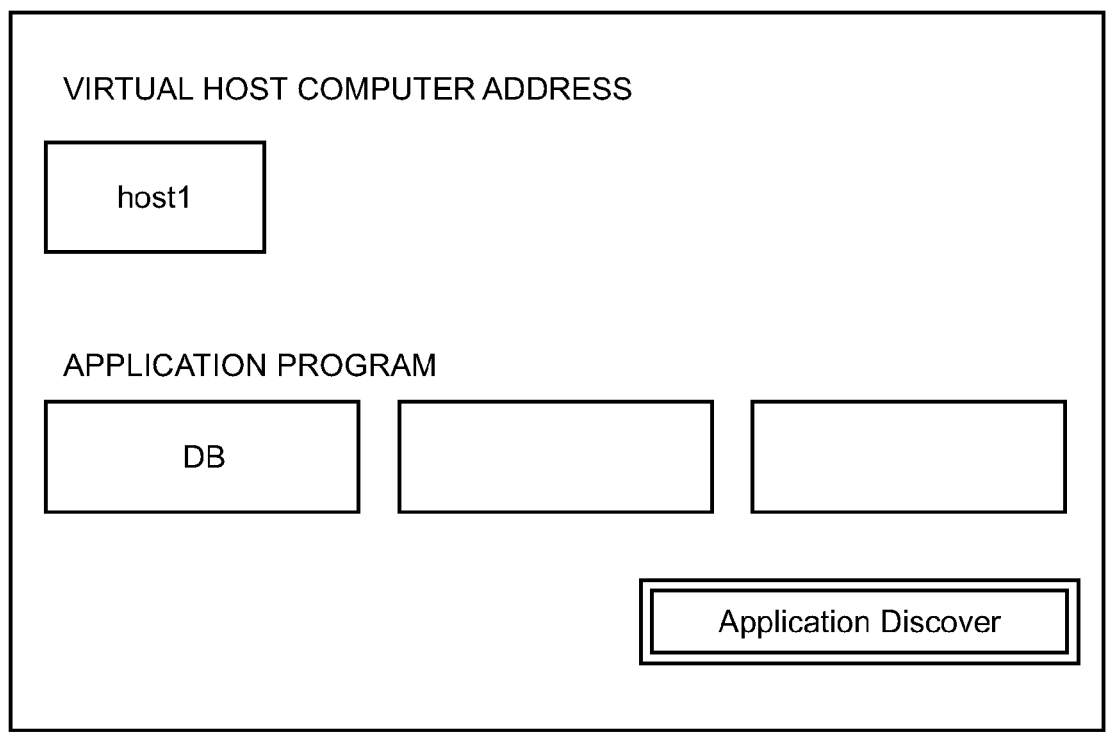
FIG. 20 is an example of a screen for acquiring backup-target application information.

The management computer 10 receives the address of the virtual host computer from the user and the name of the application running on the host computer 200 specified by this virtual host computer via a terminal or other such input screen (Step 5200). The address of the virtual host computer is specified here to eliminate the user information input step. Therefore, the host computer 200 may perform inputting, but, in this case, a plurality of host computers 200 must be specified. Further, a plurality of application names may also be specified. In this embodiment, the creation of the management-side cluster configuration information and the management-side AP-volume correspondence information are disclosed as separate processes, but these processes may be a series of steps. FIG. 20 shows an example of an input screen.

Next, the management computer 10 creates a backup control instruction (an AP configuration information report)

using the address inputted from the user as the instruction destination, and issues this instruction to the plurality of host computers 200 corresponding to the specified virtual host computer (Step 5200). For example, in a case where two host computers correspond to one virtual host computer, the management computer 10 issues the backup control instruction to the two different host computers.

The host computer 200, upon receiving this instruction, analyzes the content of this instruction (Step 5210), and next, acquires information related to the volume used by the AP 211 from either the AP 211 or the OS 212. This information comprises information about all the data used by this AP and the ID of the volume in which this data is arranged. There may be cases here in which the data used by this AP 211 is grouped into a plurality of hierarchies, in which case the host computer 200 collects all of this grouped information, creates a response to the backup control instruction as information corresponding to the volume information, and returns this response to the management computer 10 (Step 5220).

The management computer 10, upon receiving the response to the backup control instruction from the host computer 200, analyzes the content thereof and determines whether or not it is a normal response (Step 5230).

In a case where the response of the host computer 200 is normal (Step 5230: YES), the management computer 10 creates the management-side AP-volume correspondence information 13 from the acquired response (Step 5240). Specifically, the management computer 10 creates from the acquired response the management-side AP-volume correspondence information 13 that stores the information of all the data used by the AP in the data1 (13004) and the data2 (13005), and the volume ID in the 13006.

In a case where the response from the host computer 200 is not normal (Step 5230: NO), the management computer 10 notifies the user that application information acquisition failed.

(1-4-4) Process for Setting a Backup

Next, the management computer 10 implements a backup setting. In the backup setting steps, the management computer creates management-side backup information 18, management-side catalog information 14, and management-side site catalog information 15. The process for creating the respective information in the backup setting will be explained below. The management computer 10 creates all the information mentioned above on the basis of the management program 12.

Figure 21:
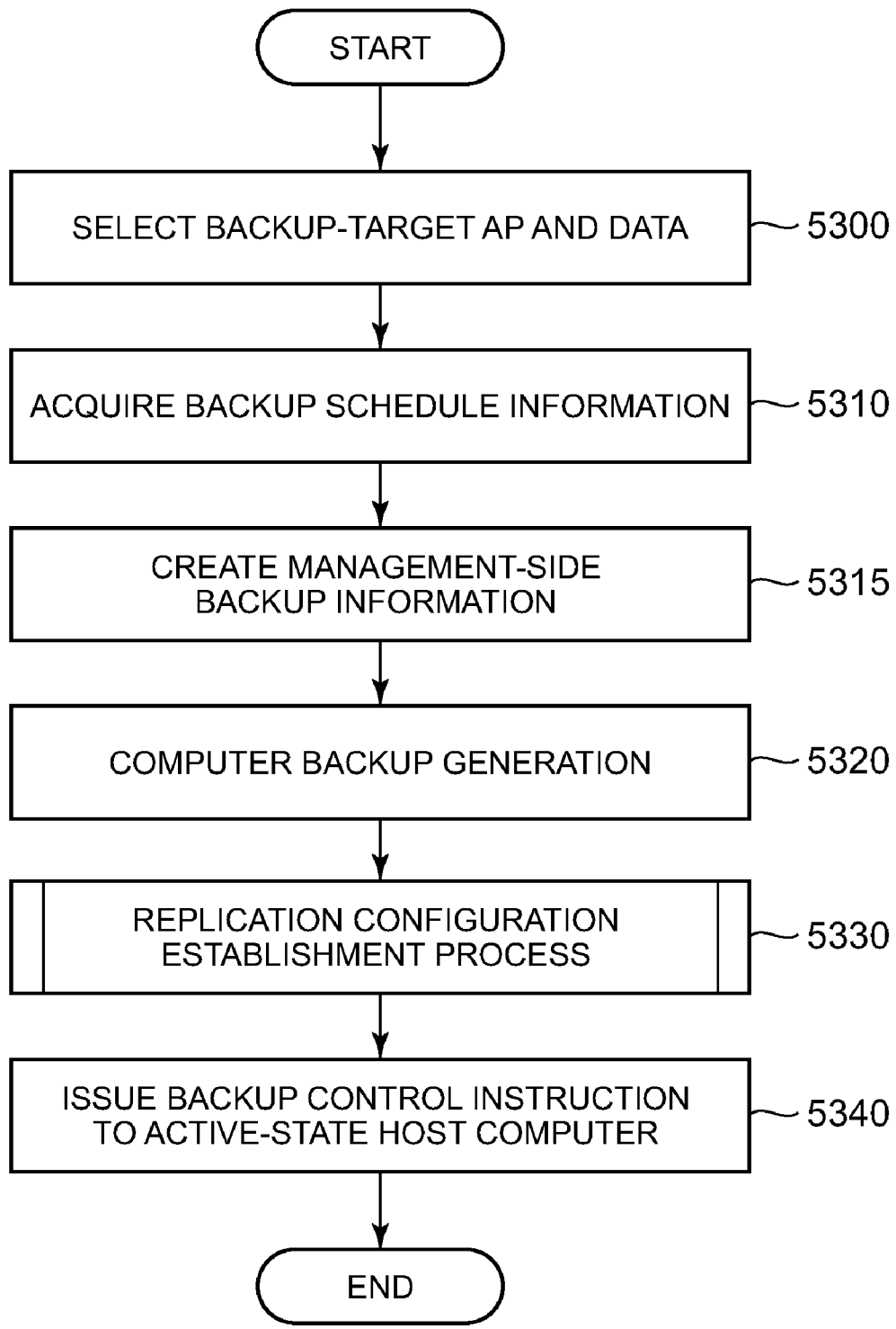
FIG. 21 is the flow of processing by which the management computer 10 creates the management-side backup information 18, the management-side catalog information 14, and the management-side site catalog information 15 required for a backup.

FIG. 21 is the flow of processing by which the management computer 10 creates management-side backup information 18, the management-side catalog information 14, and the management-side site catalog information 15 required for a backup.

Figure 22:
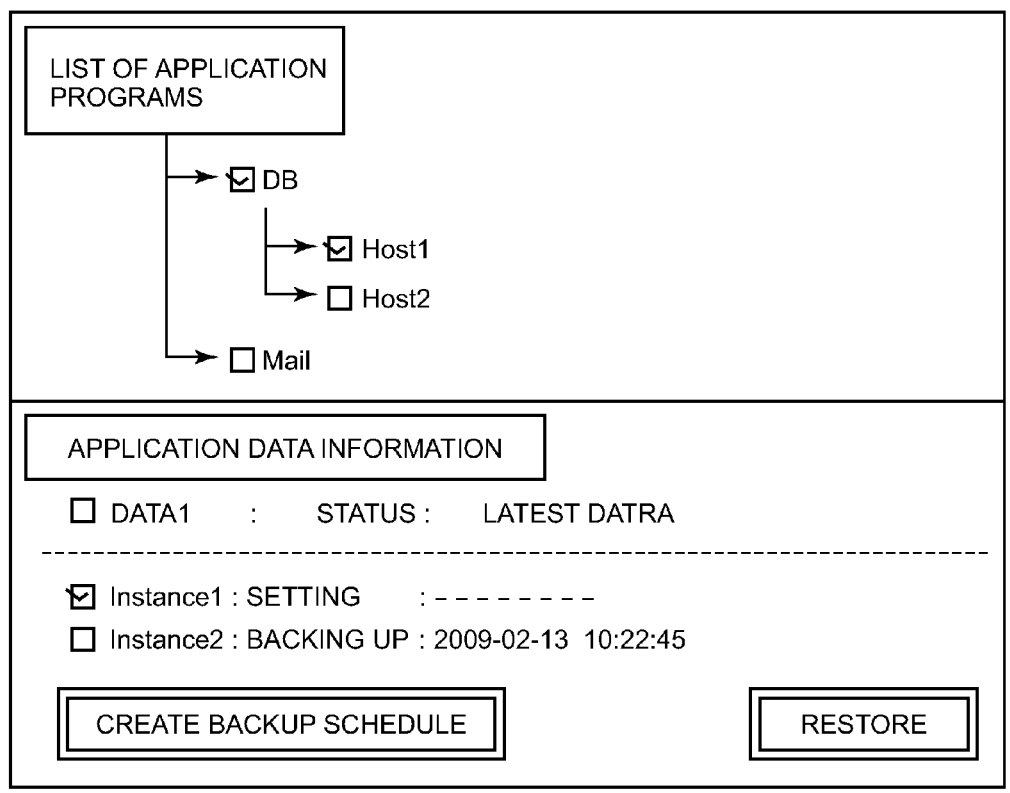
FIG. 22 is an example of a screen for acquiring information regarding data that a backup-target application will use.

First, the management computer 10 acquires the backup-target application from the user and the virtual host computer 200 information via an input screen on a terminal or the like (Step 5300). FIG. 22 shows an example of the input screen.

Figure 23:
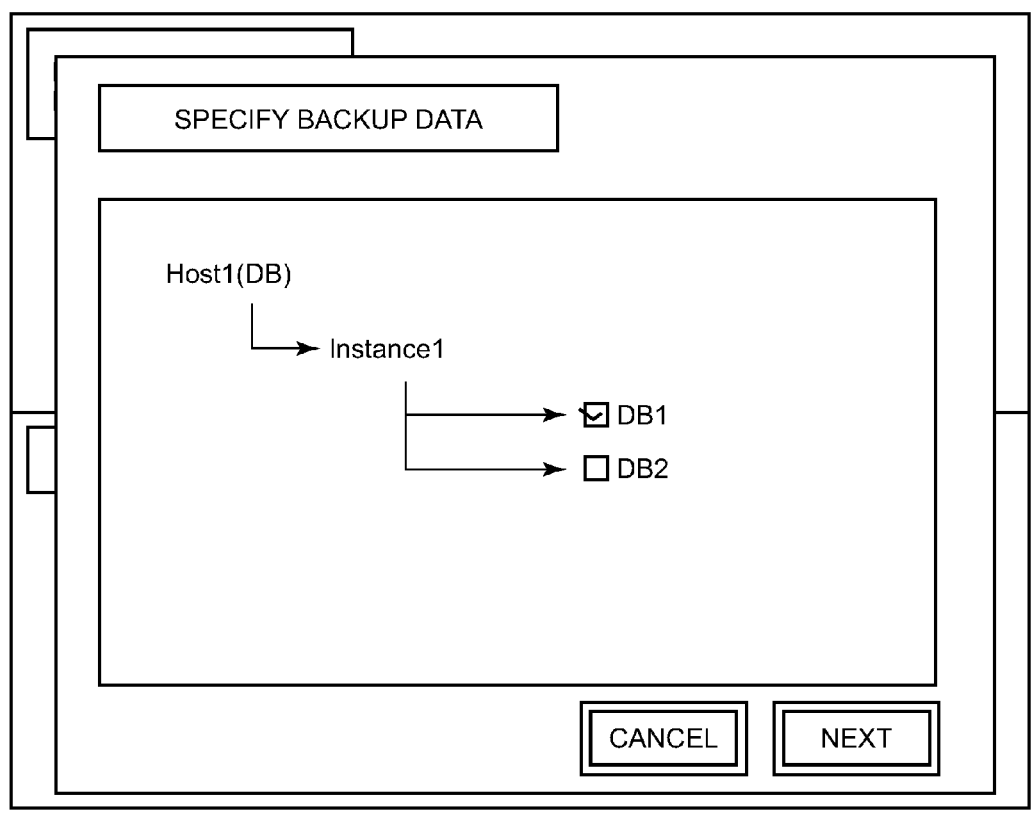
FIG. 23 is an example of a screen for acquiring information regarding detailed data that the backup-target application will use.

In FIG. 22, the management computer 10 obtains the virtual host computer Host1 and the application name DB from the list of application programs in the top portion of the drawing as backup-target information. Next, the management computer 10 acquires Instance1 from the application data information in the bottom portion of the drawing as backup-target data. In the screen of FIG. 22, when the user has finished inputting all of the information and presses the create backup schedule button, a screen for specifying the backup data appears. In accordance with this screen, the management computer 10 acquires the protection-targeted data of the backup-target application. FIG. 23 shows an example of the screen. Specifically, in FIG. 23, the management computer 10 acquires DB1 of the Instance1 as the backup-target data of the application name DB specified in FIG. 22.

Next, the management computer 10 creates the management-side backup information 18 based on the above-mentioned backup-target AP name and data (Step 5315). Specifically, the management computer 10 respectively registers the virtual host computer name (acquired in FIG. 22), the application name (acquired in FIG. 22), the data name (acquired in FIG. 22) and the detailed data name (acquired in FIG. 23) obtained from the user input into the host ID 1802, the AP 1803, the data1 (1804) and the data2 (1805), and, in addition, the management computer 10 creates a predetermined unique backup ID 1801 and registers same in the backup ID 1801.

Figure 24:
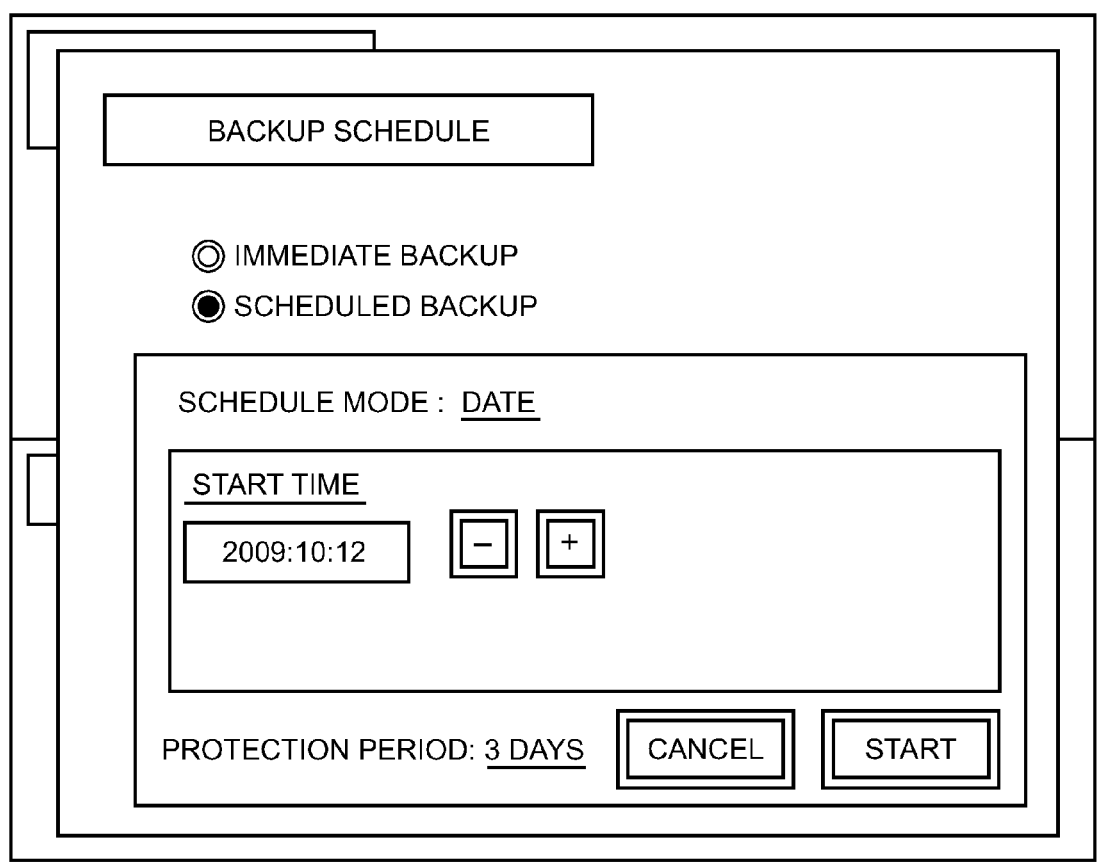
FIG. 24 is an example of a screen for acquiring backup schedule information.

Next, the management computer 10 acquired backup schedule information from the user via an input screen. The backup schedule information offers a selection of either immediate backup or scheduled backup, and for scheduled backup, also includes a start time, a protection period, and a backup interval. FIG. 24 shows an example of the input screen. In FIG. 24, the management computer 10 acquires a start time of 10:12, a protection period of three days, and a backup interval of one day as the backup schedule. In addition, the management computer 10 computes the backup frequency by dividing the time specified in the start time by the schedule mode. In the example of FIG. 24, the start time numeral (one of 10:12) is divided by the schedule mode (in day units) to produce a quotient of 1.

Next, the management computer 10 computes the number of backup generations. An example of the formula for computing the number of backup generations is shown below.

Number of backup generations=backup period×backup frequency

For example, in the example of FIG. 24, the number of generations is the three-day backup period×one-day backup frequency, or three (3).

Next, the management computer 10 performs the processing 5330 for establishing the replication configuration.

Next, the management computer 10 issues a backup control instruction to the active-state host computer 200 (Step 5340). Specifically, the management computer 10 issues a backup control instruction (a scheduler registration instruction), which comprises the management-side site catalog information 15 and the management-side backup information 18, to the active-state host computer 200. The active-state host computer 200 is the host computer that is coupled to the primary-side storage, and the status is host computer cluster program 214. Since one arbitrary host computer may be in the active state in the case of a local cluster, the management computer 10 references the host computer 200 cluster program 214 status, and decides the active-state host computer 200. The operations of the active-state host computer 200 will be explained below.

Figure 25:
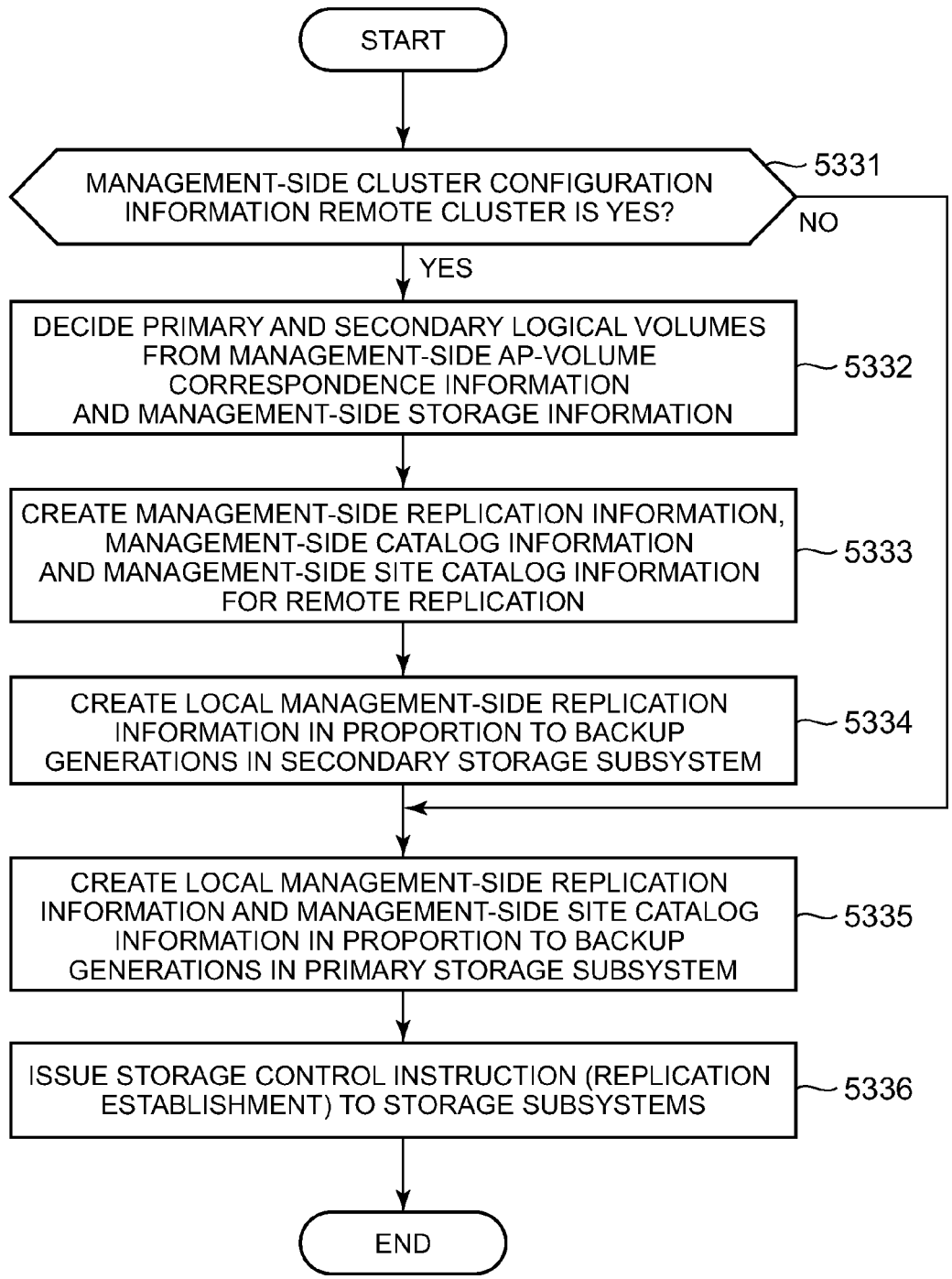
FIG. 25 is a process by which the management computer 10 establishes a replication configuration.

Next, the process by which the management computer 10 establishes the replication configuration will be explained using FIG. 25.

First, the management computer 10 checks whether or not the Remote Cluster of the information (the combination of the virtual host ID, the Remote Cluster, and the host ID) of this row of the management-side cluster configuration information 19, in which the virtual host ID of the management-side cluster configuration information 19 corresponds to the virtual host ID specified in Step 5300, is "Yes" (Step 5331).

In a case where the Remote Cluster is "Yes" (Step 5331: YES), the management computer 10 performs a remote cluster setting. That is, the management computer 10 references the management-side AP-volume correspondence information 13, which comprises the host ID 11301 and the application name 13003 specified in Step 5300. Next, the management computer 10 detects the storage subsystem ID 11402 and the HW volume ID 11404 of the management-side storage information 114C for which the host ID 13001 and the volume ID 13006 included in the corresponding row information of this management-side AP-volume correspondence information 13 correspond. The management computer 10 sets this HW volume ID 11404 as either the primary logical volume or the secondary logical volume of the remote replication used in the remote cluster (Step 5332). The setting of either the primary logical volume or the secondary logical volume, for example, may be done in accordance with the management computer 10 making a random selection, may be decided beforehand, or may be specified by the user later.

Next, the management computer 10 creates the management-side replication information 113C based on this primary logical volume and secondary logical volume decided in Step 5332. Specifically, the management computer 10 registers the information obtained from the management-side storage information in the primary logical volume, registers the storage subsystem ID 11402 in the primary storage system ID 11304, and the same HW volume ID 11404 in the primary HW volume ID 11305 with respect to the management-side replication information 113C. In addition, the management computer 10 uses the information obtained from the management-side storage information 114C as the secondary logical volume, and registers the storage subsystem ID 11402 as the secondary storage subsystem ID 11306 and the same HW volume ID 11404 as the secondary HW volume ID 11307 with respect to the management-side replication information 113C. Further, the management computer 10 decides a replication group name that will not collide with another name as the replication group ID 11300 of the management-side replication information 113C, and registers remote replication as the replication option information 11301. In addition, the management computer 10 creates the management-side catalog information 14. Specifically, the management computer 10 registers the backup ID 1801 registered in the management-side backup information (created in Step 5315) in the backup ID 1401, the Remote Cluster 19002 of the row information in which the virtual host ID of the management-side cluster configuration information 19 corresponds to the user-specified value in the Remote Cluster 1403, 19003 of the same row information in the 1st 1405 host ID, and 19004 of the same row information in the 2nd 1405 host ID. In addition, the management computer 10 registers the host computer coupled to the primary storage subsystem 1000 as the active host ID (Step 5333).

Next, the management computer 10 creates the replication information 113C for the secondary storage subsystem backup of the remote cluster. That is, the management computer 10 sets the HW logical volume set as the secondary logical volume in Step 5333 as the primary logical volume of the local replication. In addition, the management computer 10 selects a logical volume Vol that is not being used in the current replication from the management-side storage information of the same storage subsystem ID 11402, and sets this logical volume Vol as the secondary logical volume. The methods for selecting a volume here that is not being used in the replication are to acquire the storage subsystem 1000 information from the storage control instruction and to use the logical volume Vol stipulated beforehand by the user. Next, the management computer 10 decides a replication group name that will not collide with another name as the replication group ID 11300 of the management-side replication information 113C, and registers local replication as the replication option information 11301. At this point, the management computer 10 creates management-side replication information proportional to the number of backup generations (Step 5320) worked out in FIG. 21. Next, the management computer 10 creates the management-side site catalog information 15 for the secondary storage subsystem. Specifically, the management computer 10 sets the backup ID 1801 provided as the management-side backup information in 15001, sets the ID of the host computer 200 that uses the logical volume Vol set in the primary logical volume in the host 15002, and sets the initial value as the generation-in-use 15003, and registers the replication group ID 11300, which is registered in the replication information 113C created for the secondary storage subsystem of the above-mentioned remote cluster, in the first generation group 15005, the second generation group 15007 and the third generation group 15009 resulting from computing the number of generations 15004 in Step 5320 (Step 5334).

Next, either in a case where the Remote Cluster is "No" in Step 5331 or as the processing subsequent to Step 5334, the management computer 10 creates the replication information 113C for backup use in the primary storage subsystem for the local cluster and the remote cluster. That is, the management computer 10 sets the HW logical volume set as the primary logical volume in Step 5333 to the primary logical volume of the local replication. In addition, the management computer 10 selects a logical volume Vol that is not being used in the current replication from the management-side storage information of the same storage subsystem ID 11402, and sets this logical volume as the secondary logical volume. Next, the management computer 10 decides a replication group name that will not collide with another name as the replication group ID 11300 of the management-side replication information 113C, and registers local replication as the replication option information 11301. At this point, the management computer 10 creates management-side replication information proportional to the number of backup generations worked out in FIG. 21 (Step 5320). Next, the management computer 10 creates the management-side site catalog information 15 for the primary storage subsystem. Specifically, the management computer 10 sets the backup ID 1801 provided as the management-side backup information in 15001, sets the ID of the host computer 200 that uses the logical volume Vol set in the primary logical volume in the host 15002, and sets the initial value as the generation-in-use 15003, and registers the replication group ID 11300, which is registered in the replication information 113C created for the secondary storage subsystem of the above-mentioned remote cluster, in the first generation group 15005, the second generation group 15007 and the third generation group 15009 resulting from computing the number of generations 15004 in Step 5320 (Step 5335).

Lastly, the management computer 10 creates a storage control instruction (replication establishment) from the management-side replication information created in the above-mentioned step, and issues this instruction to the storage subsystem 1000 (Step 5336). The storage subsystem 1000 establishes the replication in accordance with this storage control instruction.

(1-5) Normal Operations in the Computer System of First Embodiment (1-5-1) Backup Process Once the management computer 10 completes the processing (FIG. 21) for the backup setting, a backup process is begun by the active-state host computer 200. The host computer 200 creates this information based on the backup program 213.

Figure 26:
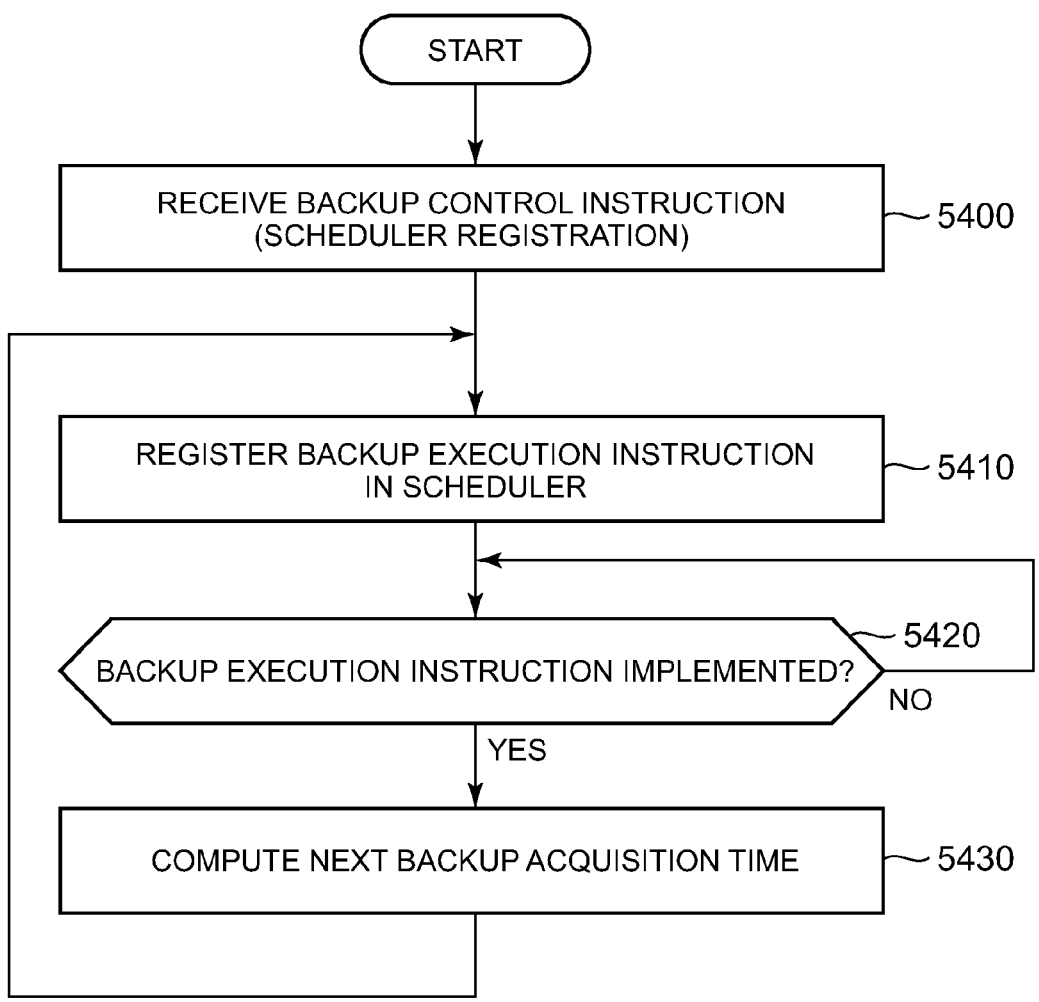
FIG. 26 is the flow of processing for a backup process by the management computer 10.

FIG. 26 is the flow of processing for a backup process by the host computer 200.

First, upon receiving the backup control instruction from the management computer 10 (Step 5400), the host computer 200 analyzes the content of the backup control instruction, extracts the management-side backup information 18 and the management-side site catalog information 15 included in this instruction, and stores this information in the memory 210 inside this host computer. In the drawings, to distinguish between the information on the management computer 10, the above-mentioned information arranged on the host computer 200 is respectively notated as the management-side backup information 18L and the management-side site catalog information 15L.

Next, the host computer 200 reads this management-side backup information 18 and the management-side site catalog information 15, and specifies a replication group that uses the backup-target application and the data thereof, and the backup start time in the backup. Next, the host computer 200 registers the backup execution instruction with respect to the application data in the scheduler 217 of this computer so that the backup is executed at the start time (Step 5410).

Next, the host computer 200 monitors the scheduler, and waits for the backup execution instruction to end (Step 5420). When the backup execution instruction has been implemented, the host computer 200 makes a quiescencing the AP 211 running on this computer. AP quiescencing is a procedure creating a state in which data is recoverable by temporarily suspending this AP, and writing the temporary data of this AP data, which exists in the AP or the OS, to all the storage subsystems. Subsequent to AP quiescencing, the host computer 200 issues a storage control instruction (a replication temporary suspend) for storing the backup of the corresponding AP data in the replication. The storage subsystem 1000, upon receiving this instruction, suspends the copying of the replication pair included in the specified replication group.

In a case where the backup execution instruction has ended (Step 5420: YES), the host computer 200 computes the time at which the next backup should be executed. Specifically, the host computer 200 performs this computation by adding the backup interval to the time at which the backup ended. Next, the host computer 200 moves to Step 5410 to register a backup instruction that will change the backup start time in the scheduler 217 (Step 5430).

(1-5-2) Restore Process

The restore process is the process by which the management computer 10 restores data that has been backed up. The management computer 10 and the host computer 200 execute this restore process on the basis of the management program 12 and the backup program 213, respectively.

Figure 27:
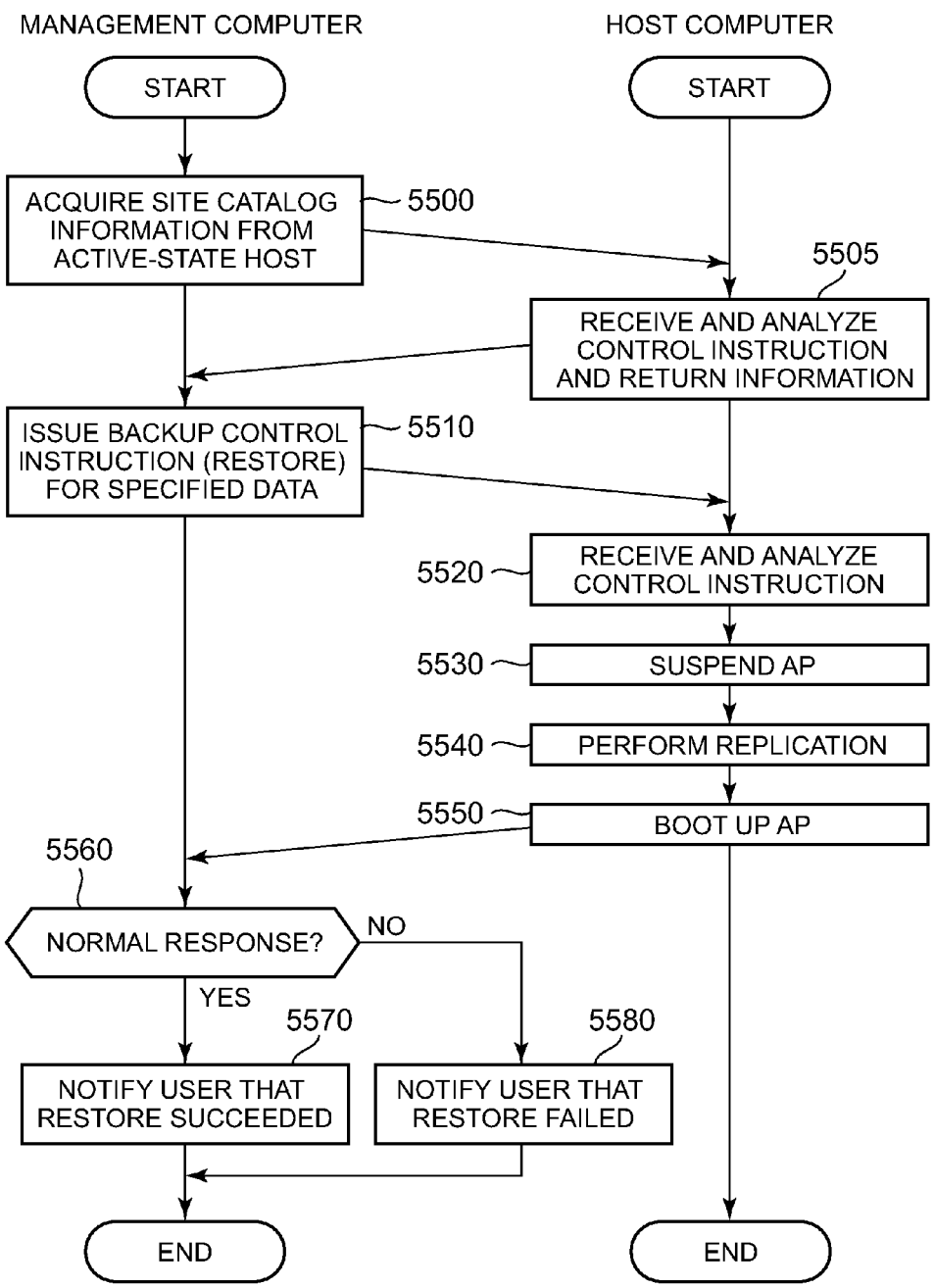
FIG. 27 is the flow of processing for a restore process by the management computer 10.

FIG. 27 is the flow of processing for the restore process by the management computer 10.

First, in a case where the user implements a restore via an input screen of a terminal or the like, the management computer 10 issues a backup control instruction (a backup status report) to the active-state host computer 200 (Step 5500). The backup status report is able to acquire the management-side site catalog information managed by a physical computer.

The host computer 200, upon receiving this backup status control instruction, analyzes the content thereof, and upon determining that the instruction content is a backup status report, returns the management-side site catalog information 15L managed by its own computer 200 included in a response (Step 5505).

Figure 28:
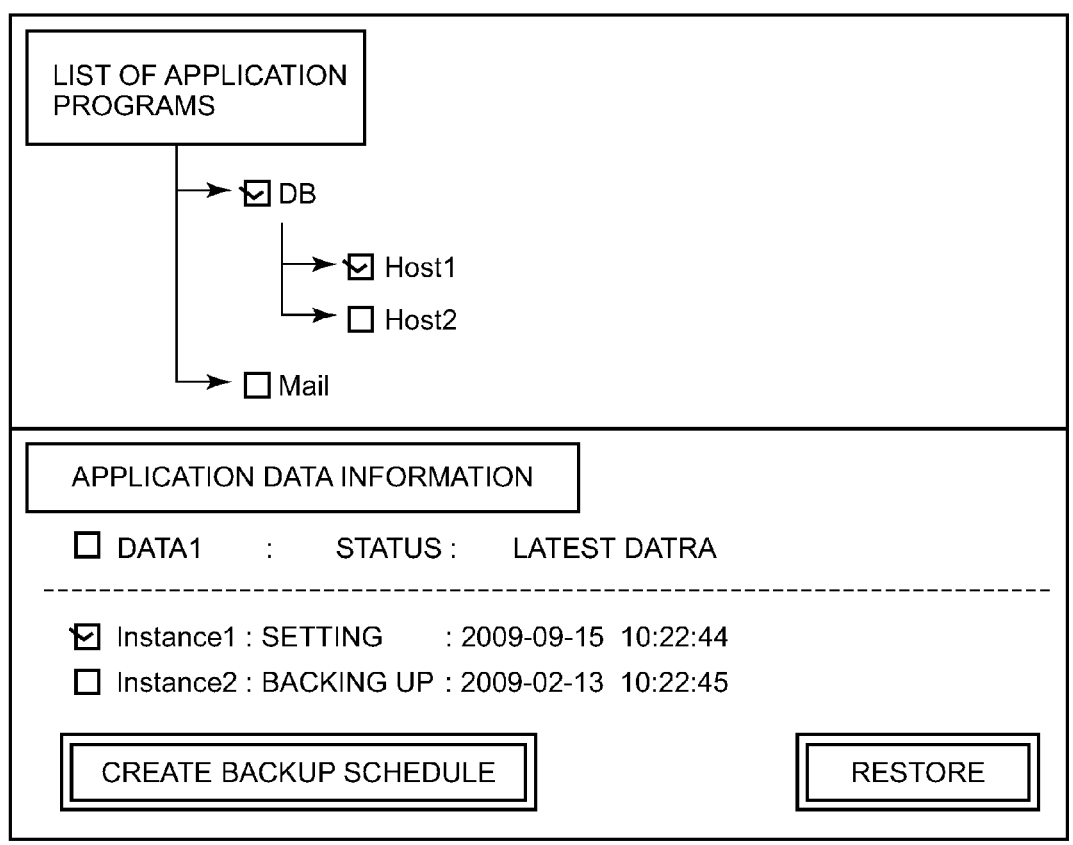
FIG. 28 shows an example of an input screen of the restore process.

Next, the management computer 10 outputs the content of this information via the input screen and acquires the application data to be restored from the user. Next, the management computer 10 issues a backup control instruction (a restore instruction) to the active-state host computer (Step 5510). FIG. 28 shows an example of the restore process input screen here.

Figure 29:
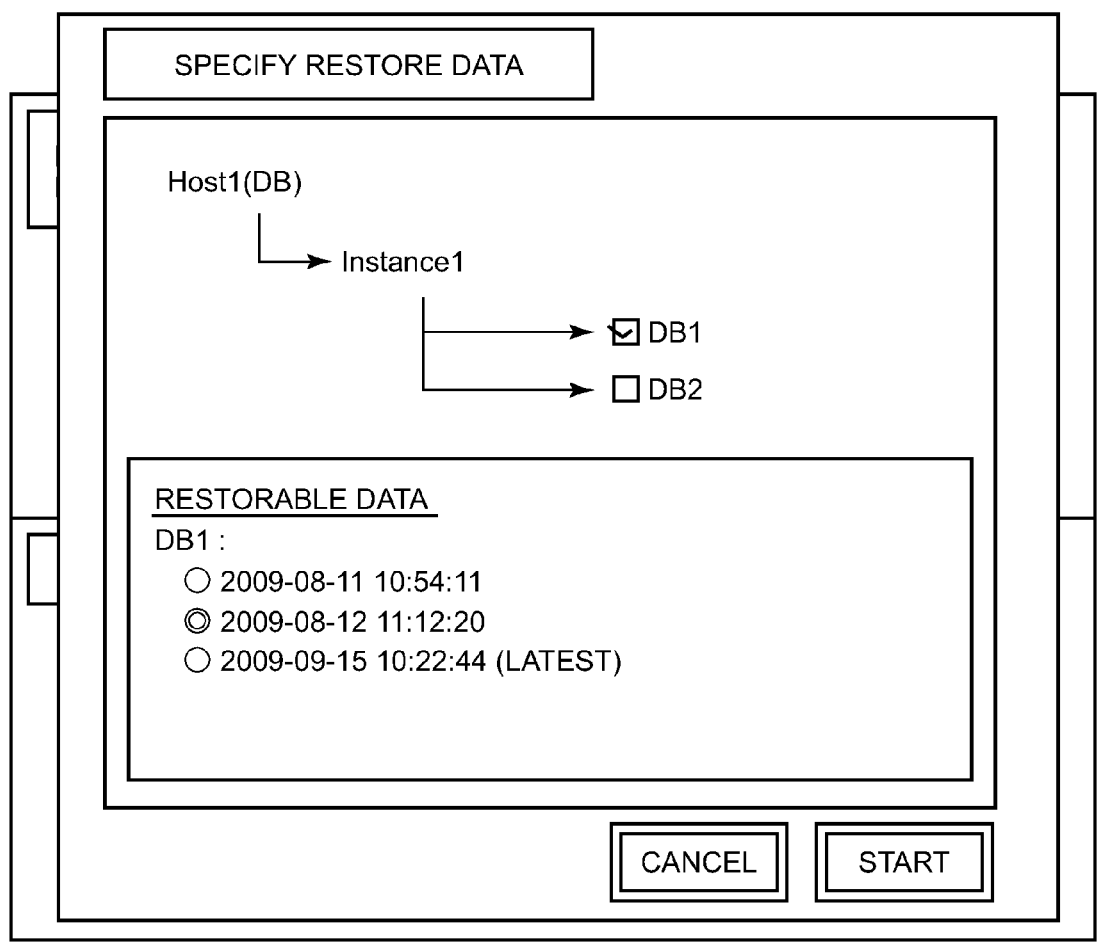
FIG. 29 is an example of an input screen for deciding the detailed data of the restore process.

The management computer 10 obtains the virtual host computer Host1 and the application name DB from the list of application programs in the upper portion of the drawing in FIG. 28 as the restore-target information. Next, the management computer 10 acquires Instance1 from the application data in the lower portion of the drawing as the restore-target data. In the screen of FIG. 28, after the user has inputted all the information and pressed the restore button, a screen for specifying the restore data appears. In accordance with this screen, the management computer 10 obtains all the information for restoring the restore-target data. FIG. 29 shows an example of the screen.

Specifically, in FIG. 29, the management computer 10 acquires DB1 of Instance1 and the backup time thereof (Aug. 12, 2009 11:12:20) as the restore-target data of the application name DB specified in FIG. 28. Subsequent to acquisition, the management computer 10 issues a backup control instruction (a restore instruction) to the active-state host computer 200 based on this information. In order to specify the active-state host computer from among a plurality of host computers, the management computer 10 references the active host ID of the management-side catalog information 14.

The host computer 200, upon receiving this backup control instruction, analyzes this control instruction and starts a restore process for this control instruction backup data (Step 5520).

Next, the host computer 200 makes a quiescencing the AP 211. To make a quiescencing the AP 211, for example, the host computer 200 uses a dedicated AP operation interface or a dedicated AP 211 control command (Step 5530).

Next, in order to perform a replication operation, the host computer 200 references the management-side site catalog information that holds the host ID of the active host computer, specifies the replication group ID of the generation specified on the restore input screen, specifies this replication group ID, and issues a storage control instruction (replication temporary-suspend instruction) to the storage subsystem 1000 in which this replication group is recorded (Step 5540). In so doing, the storage subsystem 1000 implements replication control in accordance with this instruction. Specifically, the storage subsystem 1000 overwrites the primary logical volume used by the application with the content of the secondary logical volume.

Next, the host computer 200 boots up the AP 211. When the AP 211 is running, the host computer 200 references the restored data, and continues the processing of the AP 211. Next, the host computer 200 returns a message to the management computer 10 as a response to the backup control instruction to the effect that the AP restore has been completed (Step 5550).

The management computer 10, upon receiving the response to the backup control instruction, determines from this response whether or not the restore was a success (Step 5560).

In a case where this response is that the restore was a success (Step 5560: YES), the management computer 10 notifies the user that the restore succeeded (Step 5570).

Alternatively, in a case where this response is that the restore failed (Step 5560: NO), the management computer 10 notifies the user that the restore failed (Step 5570). The user begins the restore process once again from Step 5500 to find data that is capable of being restored.

(1-6) Operations When Failure Occurs in Computer System Using Remote Cluster of First Embodiment The operations at the time of a failure will differ for a local cluster and a remote cluster. The operations subsequent to the occurrence of a failure in the remote cluster will be explained here.

(1-6-1) Backup Process Following Failure in Active-State Host Computer

First, a backup process performed following a failure of the active-state host computer will be explained. Hereinafter, the host computer in which the above-mentioned failure occurred will be called the failed host. The host computer 200 executes this process on the basis of the cluster program 214.

Figure 30:
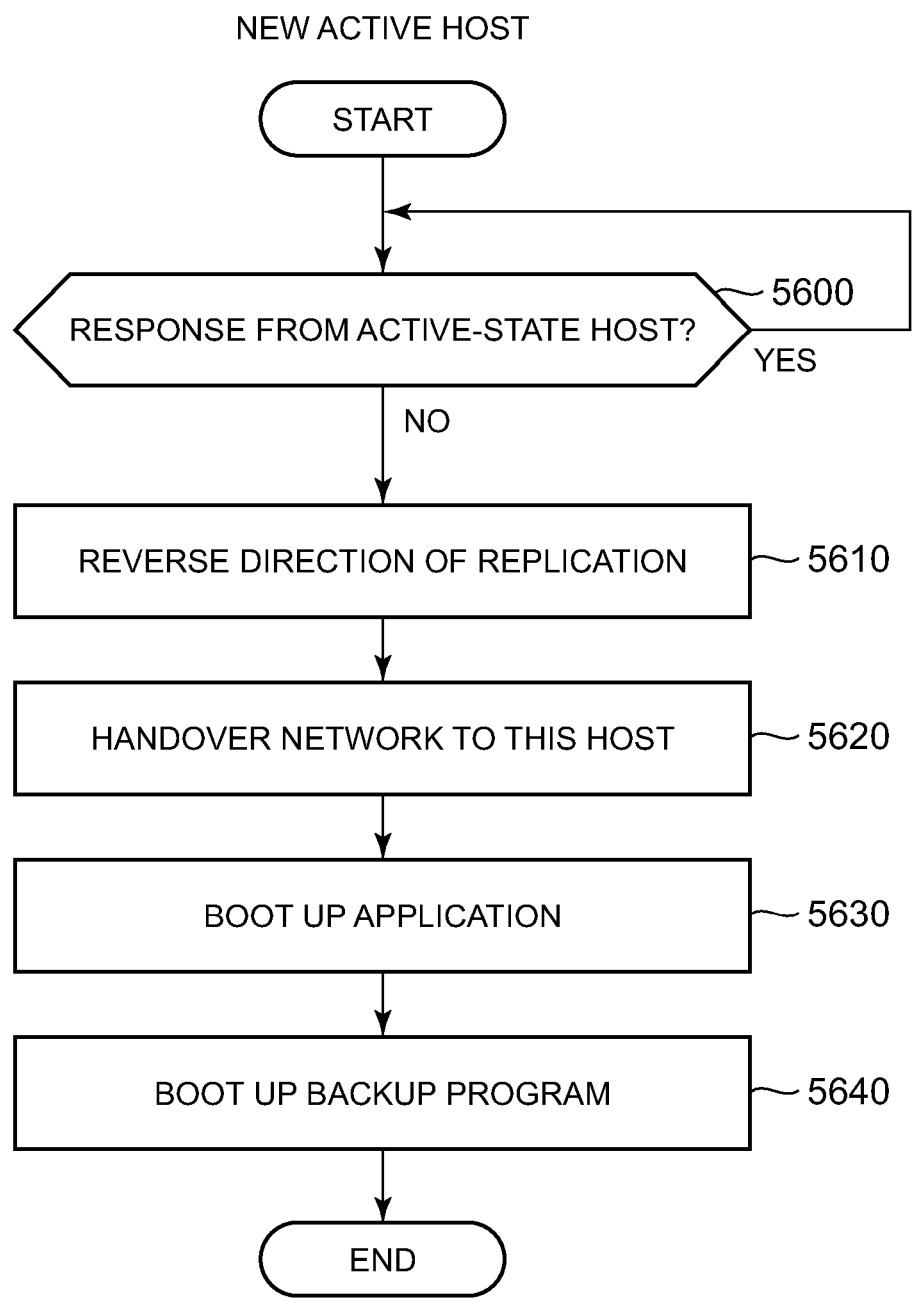
FIG. 30 shows the flow of processing for an inactive-state host computer 200 to take over a backup process subsequent to an active-state host computer 200 having experienced a failure.

FIG. 30 is the flow of processing by which the inactive-state host computer 200 takes over the backup process subsequent to the failure of the failed host 200*a*.

In order to detect the failure of a host computer 200, the plurality of host computers 200 in the cluster system regularly check the operations of a failure monitoring targeted host computer that differs from its own computer (Step 5600). This is realized by the host computer 200 communicating simple information with another host computer 200 via the control line 55.

In a case where the active-state host computer 200*a* fails at this point, the inactive-state host computer 200 that detected this failure implements a failover process to take over the processing of this active-state host computer (the failed host) (Step 5600: NO). Specifically, this inactive-state host computer 200*b* (hereinafter called the new active host) implements the following procedures.

First, the new active host 200*b* carries out a replication operation to make it possible for the new active computer 200*b* itself to use the logical volume Vol to be accessed. Specifically, the direction of the remote replication implemented between the storage subsystems 1000 must be changed, and the new active host 200*b* issues a storage control instruction (a replication reverse instruction) to the secondary storage subsystem 1000*b* (Step 5610). The secondary storage subsystem 1000*b* temporarily suspends the remote replication that at the least the storage subsystem 1000*b* itself is processing, and changes the logical volume that had been the secondary logical volume to the primary logical volume. In addition, to the extent possible, the secondary storage subsystem 1000*b* implements processing for reversing the replication direction of this remote replication. The process for reversing the replication direction causes the secondary storage subsystem 1000*b* to communicate with the primary storage subsystem 1000*a*, and in a case where both replication processes are able to continue, makes both storage subsystems 1000 cooperate to reverse the replication direction. As a result of this, the status of the above-mentioned remote replication transitions to either the copying status in which the replication is implemented in reverse, or the abnormal status.

Next, the new active host 200*b* changes the network address shown to the client computer to the address that the failed host 200*a* had been using (Step 5620).

Next, the new active host 200*b* boots up the AP 216 on its own new active host 200*b*.

Next, the new active host 200*b* boots up the backup program 213 on its own new active host 200*b*. Upon booting up the backup program 213, the new active host 200*b* references the management-side site catalog information 15L and the management-side backup information 18L arranged in the memory, and starts the backup process. Since the backup process of the new active host 200*b* here takes over the backup process that was being implemented by the failed host 200*a*, the backup execution instruction that the failed host 200*a* registered in the scheduler is changed to become the backup execution instruction of the new active host 200*b*.

(1-6-2) Post-Failover Restore Process

A post-failover restore process will be explained. The host computer 200 executes this process on the basis of the cluster program 214.

The restore process is for restoring data that has been backed up by the management computer 10. The management computer 10 and the host computer 200 execute this restore process on the basis of the management program 12 and the backup program 213, respectively.

The post-failover restore process is basically the same process as the normal-state restore process. However, processes 5540F and 5590F are added to make it possible to restore the backup data that the failed host 200*a* had acquired prior to failing.

Figure 31:
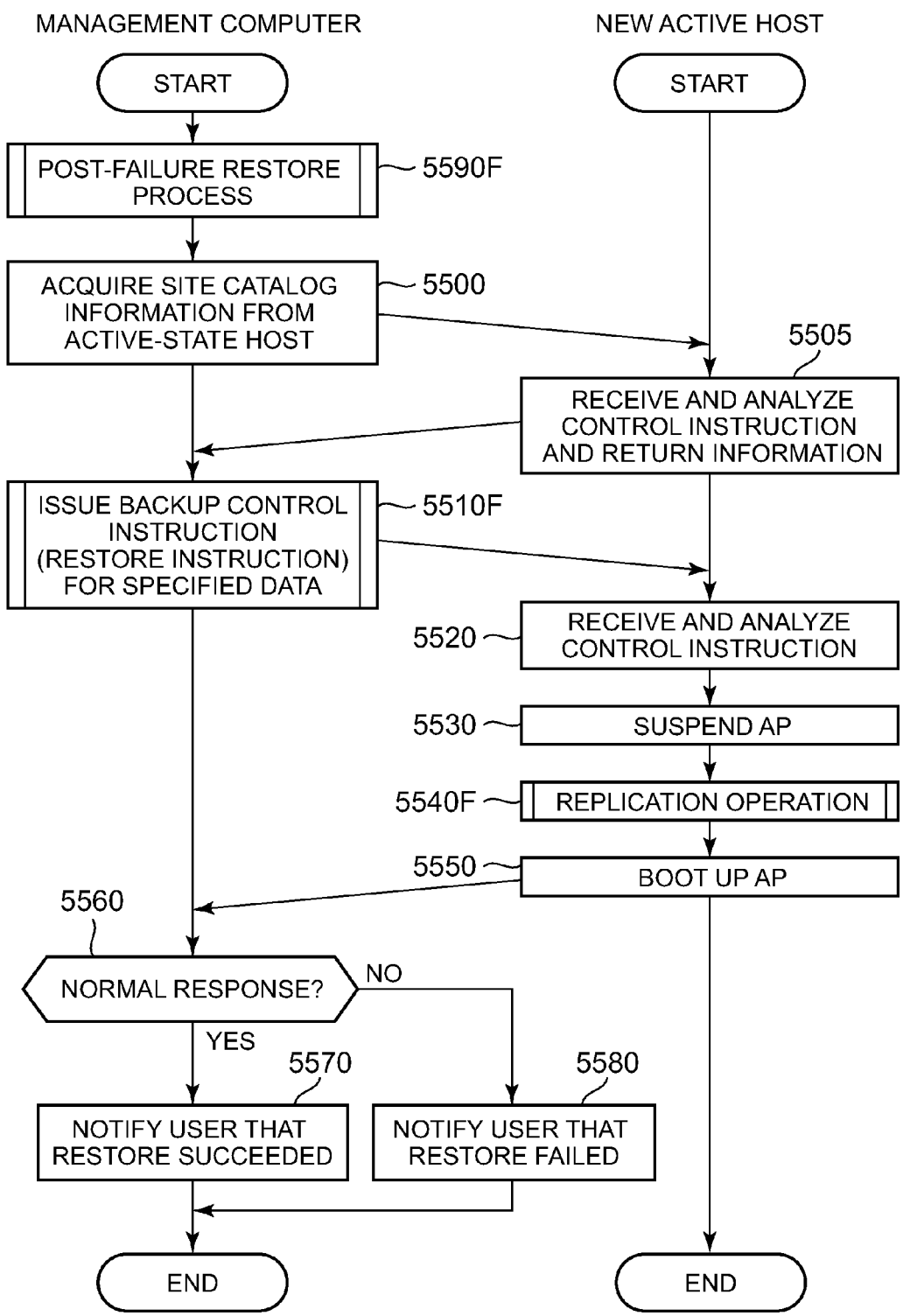

FIG. 31 is a post-failover restore process to which changes have been made compared to the normal-state restore process. The changes will be explained using FIGS. 32 and 33.

Figure 32:
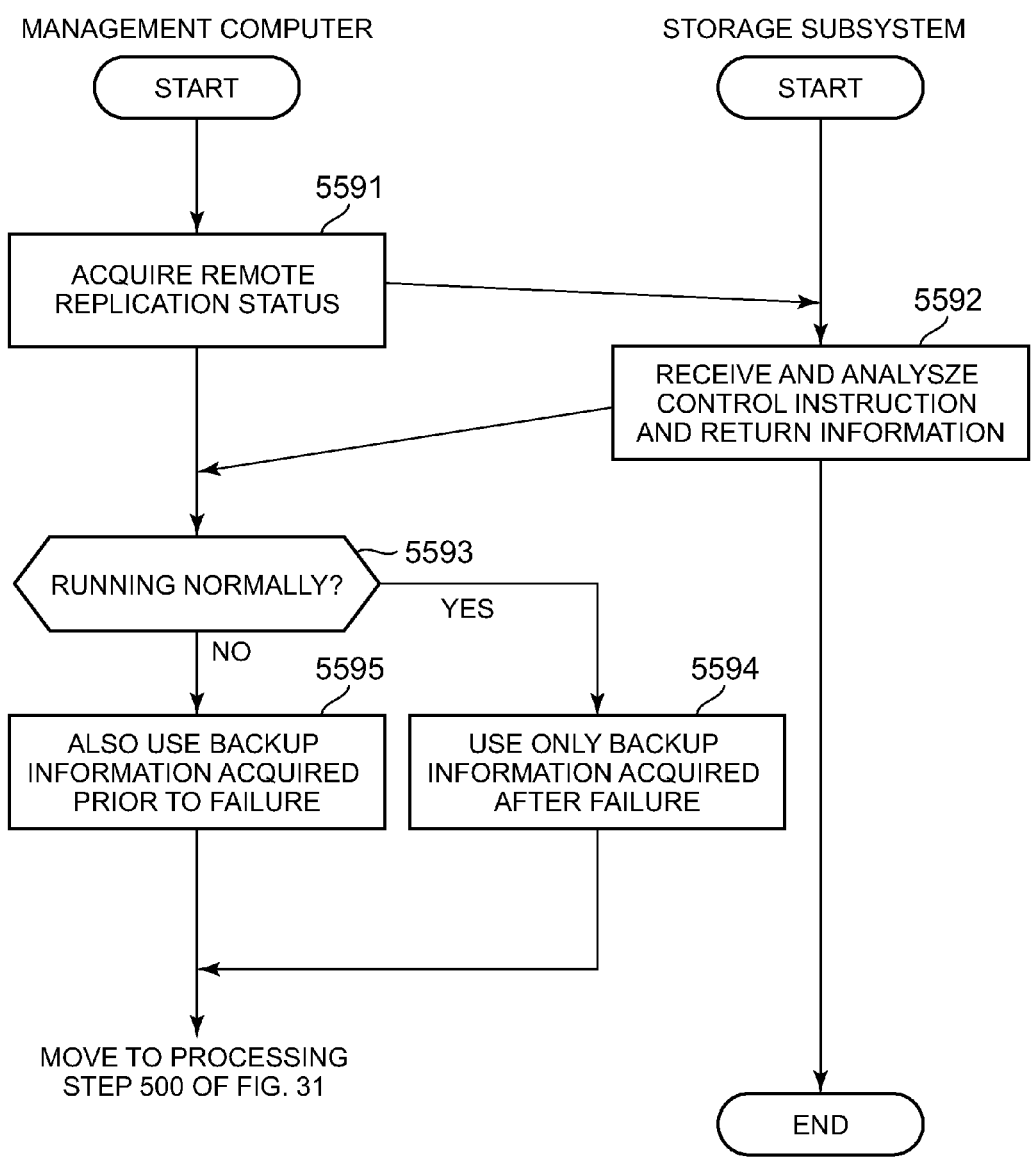
FIG. 32 is a flow for determining whether or not data that the failed host 200a backed up prior to the failure will be used as the restore-target data.

FIG. 32 is the flow of processing for determining whether or not data that the failed host 200*a* backed up in the primary storage subsystem 1000*a* prior to the failover will be used as the restore-target data, and corresponds to the processing of 5590F of FIG. 31.

First, the management computer 10 issues a storage control instruction (a replication status report) to the secondary storage subsystem 1000*b* for acquiring the status of the remote replication established between the storage subsystems (Step 5591).

The secondary storage subsystem 1000*b* that receives this control instruction analyzes the content of the instruction, references the storage-side replication pair management information 1210, reads the replication status information 12103 in this information, and returns this status information to the management computer 10 as a response to this control instruction (Step 5992).

Upon receiving this control instruction response, in a case where the remote replication is an abnormal status (Step 5593: NO), the management computer 10 determines that the failure is not only in the failed host 200*a*, but that a failure has also occurred in the primary storage subsystem 1000*a*. Specifically, the management computer 10 only references the management-side backup information 18 managed by the new active host 200*b* in order to target for recovery only that backup acquired subsequent to the failover by the new active host 200*b* without using the data backed up in this primary storage subsystem 1000*a* as the restore target (Step 5595).

Alternatively, in a case where the remote replication is not the abnormal status (Step 5593: YES), the primary storage subsystem 1000*a* is still operating after the failover, and the management computer 10 also targets for restore the management-side site catalog information (hereinafter, this management-side site catalog information will be called residual site catalog information to distinguish it from the management-side site catalog information managed by the new active host) on the failed host 200*a*, which was acquired regularly from the failed host 200*a* (Step 5594). For this reason, using the restore screen shown in FIG. 28, the restore candidate adds the amount of backup data that the failed host 200*a* had acquired prior to failover. The processing of Step 5594 here is premised on the fact that the management computer 10 acquires the management-side site catalog information from the target host computer regularly instead of just around the time of the failure. Since unrestorable data may be recorded in this management-side site catalog information when this information is old, the interval for acquiring information to the physical server is made sufficiently shorter than the scheduled backup processing interval.

The processing of Step 5510F of FIG. 31 is the same as that of the normal restore process shown in FIG. 27 with the exception of an exceptional case. An exceptional case is a case in which the user is able to select the backup data of the failed host as the restore target, and in accordance with this, the management computer 10 issues a backup control instruction (a compound restore) to the new active host. A compound restore process is one that combines a remote replication with a local replication in order to obtain the restore-target data. For this reason, the information of the remote replication under establishment between the primary and secondary storage subsystems 1000 is also included in the compound restore instruction in addition to the restore-target data information.

Figure 33:
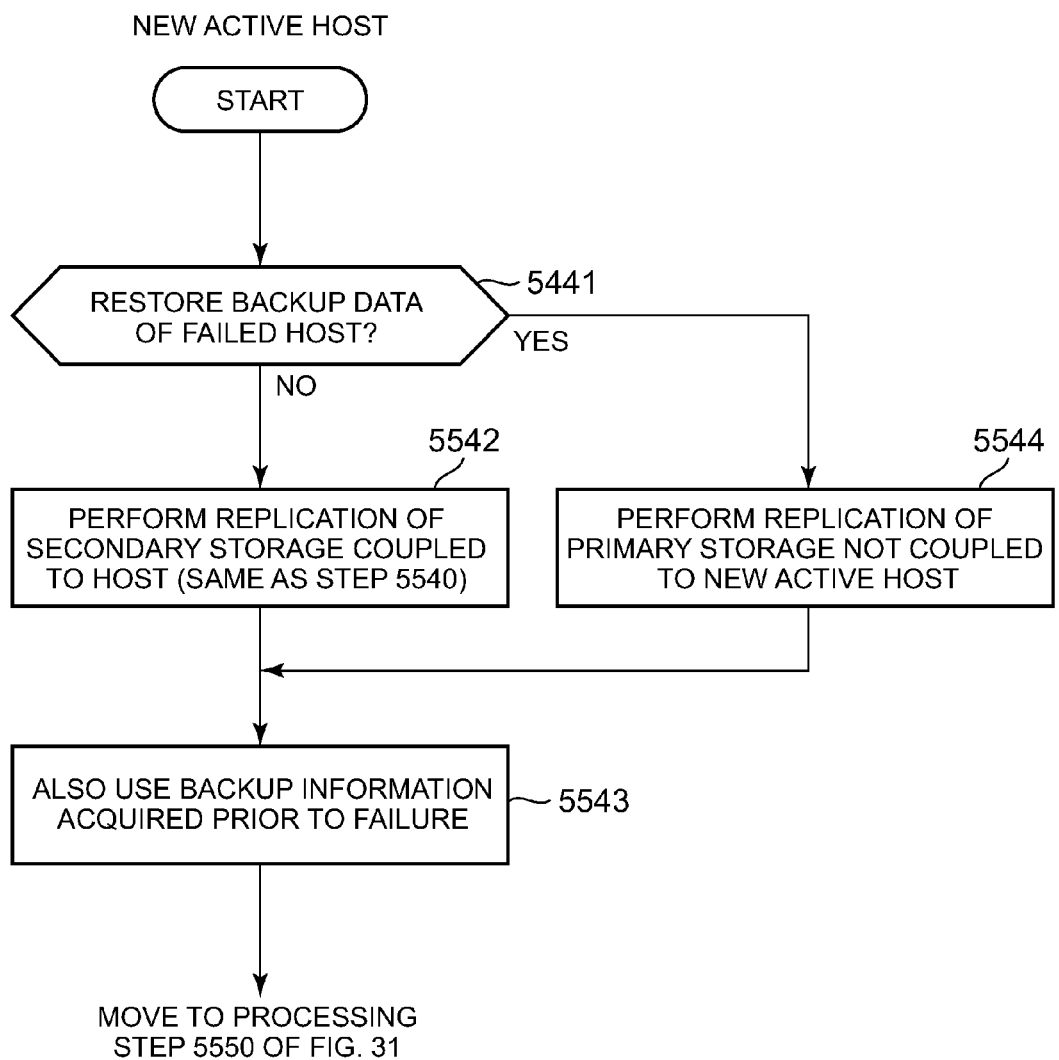
FIG. 33 is a flow related to processing for transferring data that the failed host 200a acquired prior to failure to a logical volume targeted for a restore using replication control.

FIG. 33 is the flow of replication control processing for the restore process in a case where it is possible to restore the data that the failed host 200a acquired prior to the failover, and is the processing of Step 5540F of FIG. 31.

First, the new active host 200b determines whether or not the restore target recorded in the backup control instruction received from the management computer 10 is the data of the host computer 200a that failed (Step 5541).

In a case where this restore target is not the data of the failed host 200a (Step 5541: NO), the replication operation shown in Step 5540 is carried out (Step 5543).

Alternatively, in a case where this restore target is the backup data of the failed host 200a (Step 5541: YES), the new active host 200b performs a replication operation to transfer the backup data, which is stored in the primary storage subsystem 1000a coupled to the failed host 200a, to the secondary storage subsystem 1000b. Specifically, the new active host 200b successively controls both the replication group in which the restore-target backup data included in the restore instruction of the backup control instruction is stored, and the remote replication group included in the backup control instruction. FIG. 34 is a schematic diagram related to the process for replicating the data created by the failed host 200a subsequent to the occurrence of the failure.

In FIG. 34, the new active host 200b reverses the replication (1) inside the storage subsystem 1000. Next, the new active host 200 reverses the remote replication (2). In accordance with these two procedures, for example, it is possible to set the restore target to a form that includes this data even after the failure has occurred in the host computer.

The new active host 200b references the management-side site catalog information having the host ID of the failed host, specifies this replication group ID, and issues a storage control instruction (a replication temporary-suspend instruction) to the storage subsystem 1000 in which this replication group is recorded. In so doing, the storage subsystem 1000 implements replication control in accordance with this instruction. Specifically, the new active host 200b overwrites the primary logical volume used by the failed host 200 with the contents of the secondary logical volume.

(1-7) Operations When Failure Occurs in Computer System Using Local Cluster of First Embodiment The operations at the time of a failure will differ for a local cluster and a remote cluster. The operations subsequent to a failure in the local cluster will be explained here.

(1-7-1) Backup Process Subsequent to Host Computer Failure

First, the local cluster does not require remote replication control since a plurality of storage subsystems 1000 do not exist. Therefore, the local cluster backup process differs greatly from the backup process in the remote cluster system in that Step 5610 of FIG. 30 does not exist.

Further, since the host computers 200 use the same storage subsystem 1000 and logical volume Vol, the management-side site catalog information and the management-side catalog information required in a backup are shared by the host computers 200. For this reason, similar to the data on the storage subsystem 1000 that is shared by the host computers 200, this backup information is arranged on the storage subsystem the same as the data. For this reason, even in a case where a failure occurs in the host computer 200a and failover is carried out to another host computer 200b, the new active host 200 simply reads the backup information from the storage subsystem without changing the failed host 200a backup content in the backup information, and without a change occurring on the screen that the user is using.

(1-7-2) Restore Process Subsequent to Host Computer Failure

The restore process in the local cluster system differs from that of the remote cluster system in that there is no process for controlling a remote replication. The restore process of the local cluster system differs from that of the remote cluster system in that, as long as the storage subsystem has not malfunctioned, it is possible to use as the restore-target data the same backup data as the data that has been backed up by the failed computer 200.

(1-8) Storage Subsystem Replication Process

The replication process in the storage subsystem is classified into two time periods. These are an initial copy and a regular copy. The initial copy is the replication start process, and is processing for replicating the content of the replication-source logical volume Vol in the replication destination. The regular copy is the replication process subsequent to the end of the initial copy.

(1-8-1) Initial Copy Process by Storage Subsystem

Next, a remote replication start process by the storage subsystem 1000 will be explained.

Figure 35:
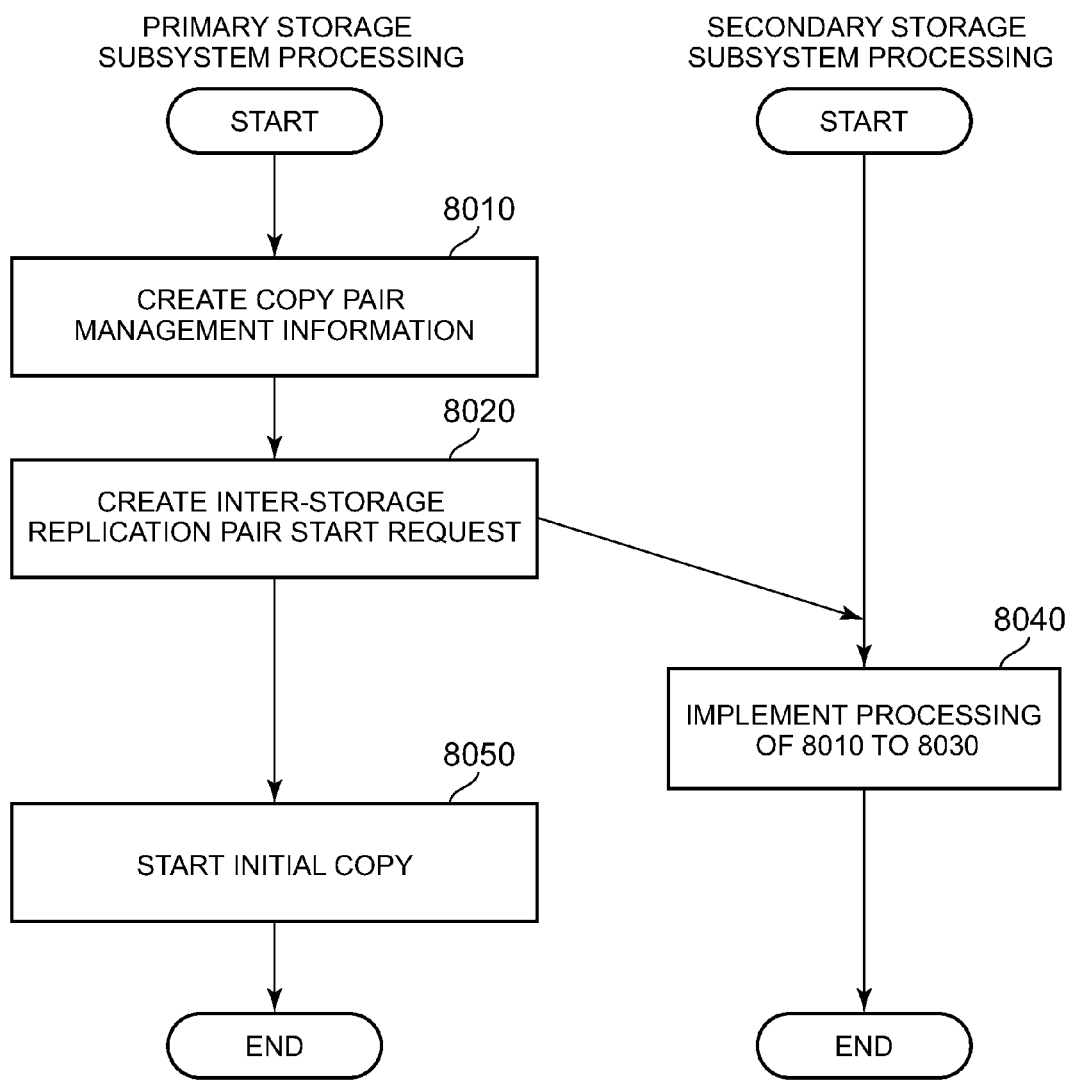
FIG. 35 is the flow of processing for starting a replication executed in accordance with the primary and secondary storage subsystems 1000.

FIG. 35 is a diagram showing a flowchart of a process for starting a replication (hereinafter, will be called the initial copy process) to be executed by the primary and secondary storage subsystems 1000 in the first embodiment.

(Step 8010) The primary storage subsystem 1000a receives a storage control instruction (replication establishment instruction), and creates storage-side replication pair management information 1210 on the basis of information extracted from this instruction. Specifically, the primary storage subsystem 1000a stores the ID of the primary logical volume specified in the replication establishment instruction in the logical volume ID 12101 of the storage-side replication pair management information 1210 as the copy-source primary logical volume. Next, the primary storage subsystem 1000a stores initial copying in the replication status information 12102 of the storage-side replication pair management information 1210. In addition, the primary storage subsystem 1000a stores the ID of the replication pair included in this request in the replication pair ID 12100, stores the copy group ID included in this request in the replication group ID 12107, and stores the copy type included in this request in the replication type 12106 of the storage-side replication pair management information 1210.

(Step 8020) The storage subsystem 1000a creates an inter-storage replication pair start request comprising information corresponding to the information included in the replication establishment instruction to the storage subsystem 1000b that is the remote replication start partner.

The information included in the inter-storage replication pair start request is shown below.

(1) ID of primary storage subsystem of start-target replication pair and ID of primary logical volume.
(2) ID of secondary storage subsystem of start-target replication pair and ID of secondary logical volume.
(3) Copy type of start-target replication pair.
(4) ID of start-target replication pair.
(5) ID of copy group in which the start-target replication pair are included.

(Step 8040) The secondary storage subsystem 1000b that receives this request carries out 8010 as the processing corresponding to this request to either create or update the storage-side replication management information 1210b.

(Step 8050) Next, the primary storage subsystem 1000a starts the initial copy for copying the data stored in the primary logical volume to the secondary logical volume of the secondary storage subsystem.

Furthermore, the primary storage subsystem 1000a, which is in the process of initial copying, reads the data from the primary logical volume identified by the logical volume ID 12102 of the storage-side replication pair management information 1210A, creates an initial copy request comprising the read-source primary logical volume ID (or the corresponding secondary logical volume ID), the primary logical volume address (or the corresponding secondary logical volume address), and the read data, and sends this request to the secondary storage subsystem 1000b.

The secondary storage subsystem 1000b, which receives this initial copy request, writes the read data from the primary logical volume to the secondary logical volume and the secondary logical volume address specified in this request.

(1-8-2) Regular Copy Process by Storage Subsystem

When the initial copy process has ended, the primary and secondary storage subsystems 1000 start the operation of a continuation process of the remote copy (hereinafter, called the regular copy). In other words, the primary and secondary storage subsystems 1000 start a regular copy operation after the data of the primary logical volume and the data of the secondary logical volume are identical.

Specifically, the primary storage subsystem 1000a, upon receiving a write request after the initial copy process has ended, executes the regular copy process. For example, the primary storage subsystem 1000a, upon writing data to the primary logical volume, also writes this write-data to the secondary logical volume.

Figure 36:
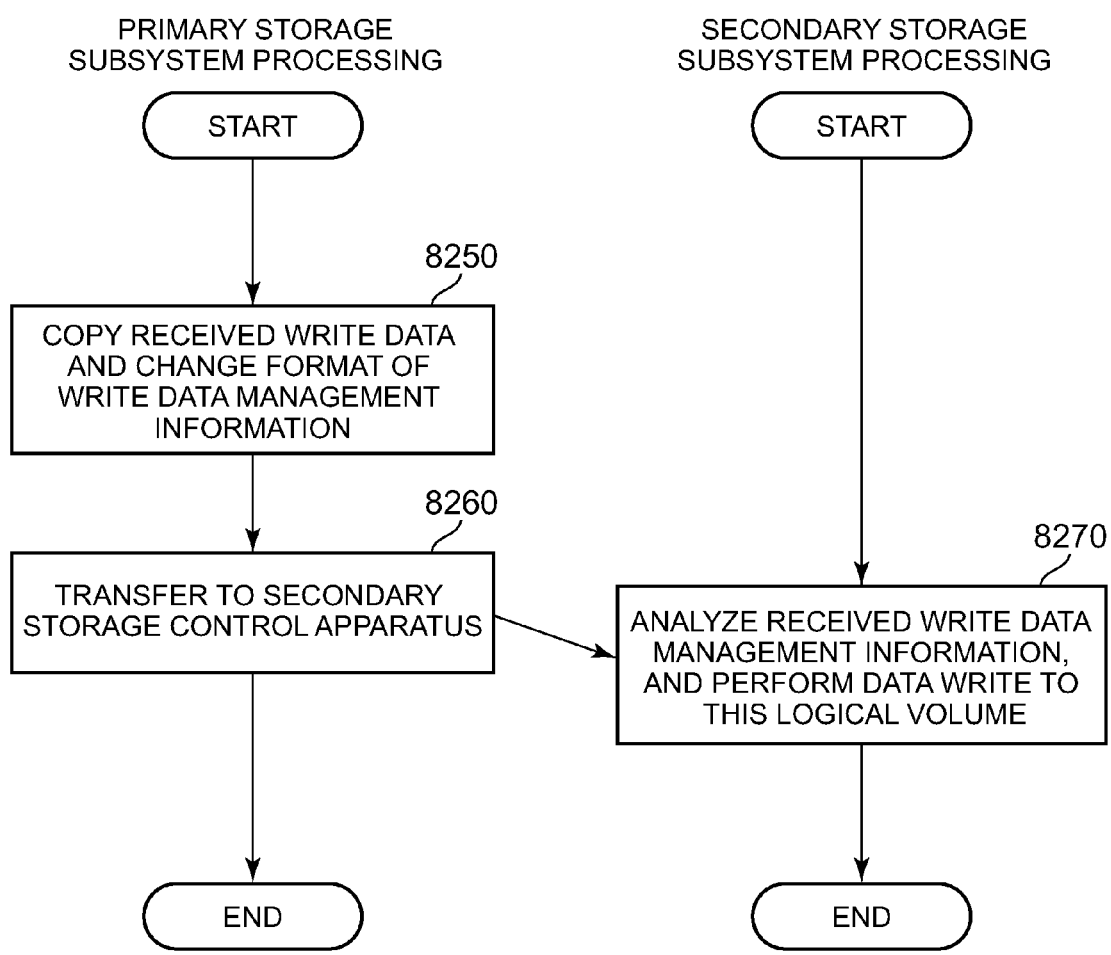
FIG. 36 is a flowchart showing an example of a regular copy process executed by the storage subsystems 1000.

FIG. 36 is a flowchart showing an example of the regular copy process executed by the storage subsystems 1000 in the first embodiment of the present invention. Furthermore, a regular copy may also be realized by processing other than FIG. 36.

The primary storage subsystem 1000a receives an I/O from the host computer 200. This I/O is a write request. Next, the primary storage subsystem 1000a extracts the write-requested data (write data) from the I/O request. Next, the primary storage subsystem 1000a extracts the storage ID and the volume ID from the I/O request.

Next, the primary storage subsystem 1000a writes the extracted write data to the logical volume Vol identified by the acquired logical volume ID.

Figure 37:
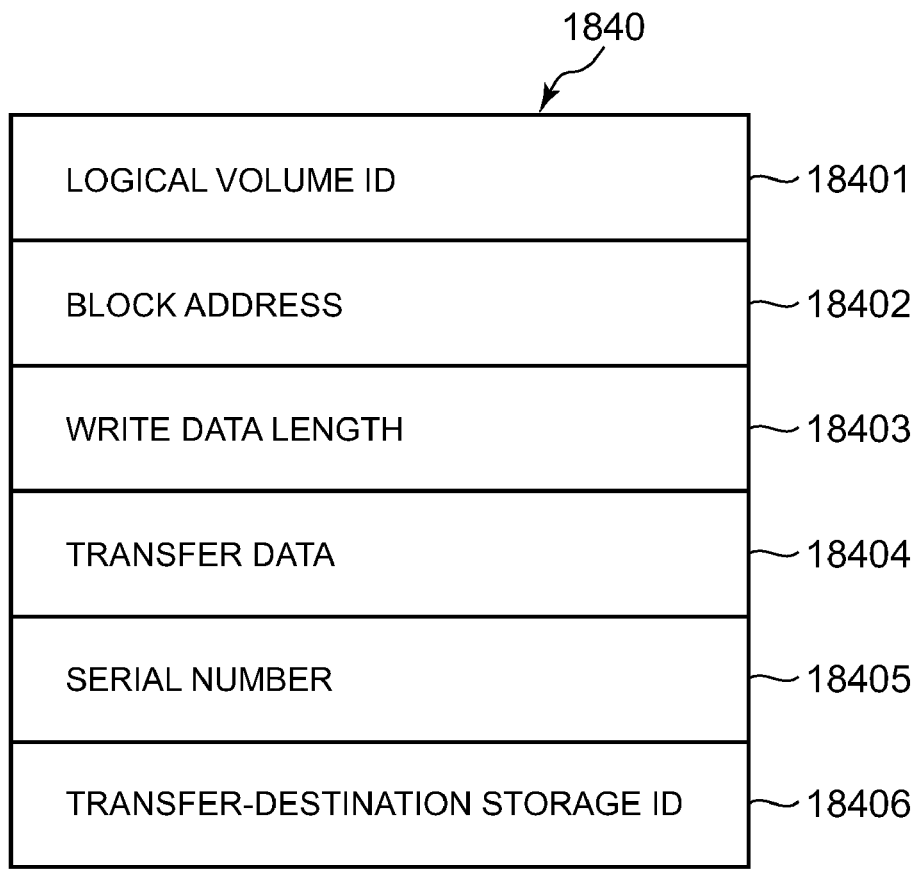
FIG. 37 is a data transfer request created by the storage subsystem 1000 during the implementation of a remote replication.

(Step 8250) Next, the primary storage subsystem 1000a creates the data transfer request shown in FIG. 37.

Specifically, the copy-source primary storage subsystem 1000a selects replication pair management information 1210 in which the acquired logical volume ID and the logical volume ID 12101 of the replication pair management information 1210A are identical. Next, the replication-source primary storage subsystem 1000a extracts the replication-target storage ID 12104 and the replication-target volume ID 12105 from the selected replication pair management information 1210A.

Next, the primary storage subsystem 1000a stores the extracted replication-target volume ID 12105 in the logical volume ID of the data transfer request. Next, the primary storage subsystem 1000a stores the address of the block in which the write data is stored in the block address of the data transfer request.

Next, the primary storage subsystem 1000a stores the size of the write data in the write data length of the data transfer request. Next, the primary storage subsystem 1000a stores either all or part of the write data in the transfer data of the data transfer request.

Next, the primary storage subsystem 1000a stores the order in which this transfer request was created in the regular copy in the data transfer request serial number 18405. Next, the primary storage subsystem 1000a stores the extracted replication-target storage ID in the transfer-destination storage ID 18406 of the data transfer request 1840.

(Step 8260) Next, the primary storage subsystem 1000a sends the created data transfer request 1840 to the secondary storage subsystem 1000b.

(Step 8270) The secondary storage subsystem 1000b receives the data transfer request 1840. In so doing, the secondary storage subsystem 1000b writes the transfer data 23D of the data transfer request 1840 to the logical volume Vol identified by the logical volume ID 18401 of the data transfer request 1840.

Then, the storage subsystems 1000 end the processing of the regular copy corresponding to the one I/O request.

The preceding explanation has explained a management system that manages a plurality of computers and a storage system, which provides a plurality of logical volumes and which is configured from one or more apparatuses, this management system comprising a port for coupling to the above-mentioned plurality of host computers, a memory for storing cluster information, a processor for detecting a failover that has occurred in the above-mentioned plurality of computers and for updating the above-mentioned cluster information, and an input/output device for receiving a backup setting request comprising a virtual host identifier for input use, an application instance identifier for input use, and a backup schedule input value.

Furthermore, it was explained that the above-mentioned processor:

(A) references the above-mentioned cluster information, thereby specifying an active-state host computer corresponding to the above-mentioned virtual host identifier for input use, and an inactive-state computer corresponding to the above-mentioned active-state host computer included in the above-mentioned plurality of host computers;

(B) specifies a first storage subsystem included in the above-mentioned storage system, and a first logical volume provided by the above-mentioned first storage subsystem, which are accessed by the above-mentioned active-state host computer, by executing an application program identified by the above-mentioned application instance identifier for input use;

(C) determines whether the above-mentioned inactive-state host computer is able to access the above-mentioned first storage subsystem and the above-mentioned first logical volume;

(D) in a case where the above-mentioned inactive-state host computer is not able to access the above-mentioned first logical volume, selects a second storage subsystem included in the above-mentioned storage system that is accessible from the above-mentioned inactive-state host computer, and sends to the above-mentioned first storage subsystem a replication establishment instruction for disaster recovery use that makes the above-mentioned first logical volume a copy source, and makes a second logical volume provided by the above-mentioned second storage subsystem a copy destination; and (E) causes the above-mentioned active-state host computer to control a replication process for backup use, which, in accordance with the above-mentioned backup schedule input value, makes the above-mentioned first logical volume the copy source and makes one or more third logical volumes included in the above-mentioned first storage subsystem the copy destination (s) by sending to the above-mentioned active-state host computer via the above-mentioned port a backup schedule registration instruction comprising backup schedule instruction information created on the basis of the above-mentioned backup schedule input value.

Furthermore, it was explained that the above-mentioned processor:

(F) may acquire replication process information from the above-mentioned active-state host computer, thereby storing the creation time of backup data created in accordance with the above-mentioned backup schedule input value and the identifier (s) of the above-mentioned one or more third logical volumes that store the above-mentioned backup data in the above-mentioned memory as catalog information for management use; and (G) may reference the above-mentioned catalog information for management use, thereby displaying on the above-mentioned input/output device one or more creation times of the backup data corresponding to the above-mentioned application program specified by the above-mentioned virtual host identifier for input use and the above-mentioned application instance identifier for input use.

Further, it was also explained that in a case where the above-mentioned inactive-state host computer becomes the next active-state host computer by taking over the processing of the above-mentioned application program from the above-mentioned active-state host computer in accordance with a failover, the above-mentioned processor:

(H) may acquire next information for the control of the backup replication process based on the above-mentioned backup schedule input value, which the above-mentioned next active-state host computer inherited from the above-mentioned active-state host computer;

(I) in accordance with this next information, may store in the above-mentioned memory as the above-mentioned catalog information the creation time of the next backup data created under the control of the active-state host computer and the identifier(s) of the one or more third logical volumes that store the above-mentioned backup data; and (J) may reference the above-mentioned catalog information for management use, thereby displaying on the above-mentioned input/output device the creation time of the above-mentioned next backup data as the creation time of the backup data corresponding to the above-mentioned application program.

Further, it was explained that the above-mentioned input/output device may receive a restore instruction specifying a prescribed backup data inputted based on the above-mentioned virtual host identifier for input use and the application instance identifier for input use, and the display of the creation time of the above-mentioned backup data, and that the processor may specify one of the above-mentioned third logical volumes that store backup data specified by the above-mentioned restore instruction, and by sending the restore instruction specifying one of the above-mentioned specified third logical volumes to the above-mentioned active-state host computer, may cause the above-mentioned storage system to return the backup data stored in one of the above-mentioned third logical volumes to the above-mentioned first logical volume.

Further, it was also explained that in a case where the above-mentioned inactive-state host computer takes over the processing of the above-mentioned application program from the above-mentioned active-state host computer in accordance with a failover, thereby becoming the next active-state host computer, the above-mentioned processor:

(H) may acquire next information for the control of the backup replication process based on the above-mentioned backup schedule input value, which the above-mentioned next active-state host computer inherited from the above-mentioned active-state host computer;

(I) in accordance with this next information, may store the creation time of the next backup data created under the control of the active-state host computer and the identifier (s) of the one or more third logical volumes that store the above-mentioned backup data in the above-mentioned memory as the above-mentioned catalog information; and (J) may reference the above-mentioned catalog information for management use, thereby displaying on the above-mentioned input/output device the creation time of the above-mentioned next backup data as the creation time of the backup data corresponding to the above-mentioned application program.

Further, it was also explained that in a case where the above-mentioned inactive-state host computer becomes the next active-state host computer by taking over the processing of the above-mentioned application program from the above-mentioned active-state host computer in accordance with a failover without being able to access the above-mentioned first storage subsystem, the above-mentioned processor:

(K) may acquire next information for controlling the next backup replication process, which, based on the above-mentioned backup schedule input value, makes the above-mentioned second logical volume the copy source and makes one or more fourth logical volumes provided by the above-mentioned second storage subsystem the copy destination (s);

(L) in accordance with the above-mentioned next information, may store in the above-mentioned memory as the above-mentioned catalog information the creation time of the next backup data created under the control of the active-state host computer, and the identifier (s) of the above-mentioned one or more third logical volumes that store the above-mentioned backup data; and (M) may reference the above-mentioned catalog information for management use, thereby displaying on the above-mentioned input/output device the creation time of the above-mentioned next backup data stored in the above-mentioned fourth logical volume as the creation time of the backup data corresponding to the above-mentioned application program, and may suppress the display of the creation time of the above-mentioned backup data stored in the above-mentioned third logical volume.

What is claimed is:

1. A management method of managing a storage system, the storage system providing a plurality of logical volumes and being configured from one or more apparatuses, the storage system providing a plurality of host computers which are coupled to a port, the method comprising:

storing cluster information in a memory;

detecting, via a processor, a failover that has occurred in the plurality of host computers and updating the cluster information;

receiving, via an input/output device, a backup setting request including a virtual host identifier for input use, an application instance identifier for input use, and a backup schedule input value;

(A) specifying, via the processor, by referencing the cluster information, an active-state host computer corresponding to the virtual host identifier for input use, and an inactive-state host computer corresponding to the active-state host computer included in the plurality of host computers;

(B) specifying, via the processor, a first storage subsystem included in the storage system, and a first logical volume provided by the first storage subsystem, which the active-state host computer accesses by executing and application program identified by the application instance identifier for input use;

(C) determining, via the processor, whether the inactive-state host computer is able to access the first storage subsystem and the first logical volume;

(D) selecting, via the processor, in a case where the inactive-state host computer is not able to access the first logical volume, a second storage subsystem included in the storage system that is accessible from the inactive-state host computer, and sending to the first storage subsystem a replication establishment instruction for disaster recovery use, with the first logical volume being made a copy source, and a second logical volume provided by the second storage subsystem being made a copy destination; and (E) by sending, via the processor, to the active-state host computer, via the port, a backup schedule registration instruction including backup schedule instruction information created on the basis of the backup schedule input value, causing the active-state host computer to control a replication process, for backup use, with the first logical volume in accordance with the backup schedule input value being made the copy source, and with one or more third logical volumes included in the first storage subsystem being made copy destinations.

2. A management method according to claim 1, further comprising:

(F) by acquiring, via the processor, replication process information from the active-state host computer, storing in the memory as catalog information for management use a creation time of backup data created in accordance with the backup schedule input value and the identifiers of the one or more third logical volumes that store the backup data; and (G) by referencing, via the processor, the catalog information for management use, displaying on the input/output device one or more creation times of the backup data corresponding to the application program specified by the virtual host identifier for input use and the application instance identifier for input use.

3. A management method according to claim 2, further comprising:

receiving via the input/output device, a restore instruction specifying a prescribed backup data inputted based on the virtual host identifier for input use and the application instance identifier for input use, and displaying the backup data creation time; and specifying, via the processor, one of the third logical volumes that store backup data specified by the restore instruction, and by sending the restore instruction specifying one of the specified third logical volumes to the active-state host computer, causing the storage system to return the backup data stored in one of the third logical volumes to the first logical volume.

4. A management method according to claim 3, wherein, in a case where the inactive-state host computer becomes a next active-state host computer by taking over processing of the application program from the active-state host computer as the result of a failover:

(H) acquiring, via the processor, next information for controlling the replication process, which the next active-state host computer takes over from the active-state host computer;

(I) in accordance with this next information, storing, via the processor, in the memory, as the catalog information, a next backup data creation time created under the control of the active-state host computer, and the identifiers of the one or more third logical volumes that store the backup data; and (J) by referencing, via the processor, the catalog information for management use, displaying on the input/output device the next backup data creation time as a creation time of the backup data corresponding to the application program.

5. A management method according to claim 3, wherein, in a case where the inactive-state host computer becomes a next active-state host computer by taking over the execution of the application program from the active-state host computer as the result of a failover without being able to access the first storage subsystem:

(K) acquiring, via the processor, the next information for controlling the next backup replication process, with the second logical volume based on the backup schedule input value being made the copy source while one or more fourth logical volumes provided by the second storage subsystem being made the copy destinations;

(L) in accordance with the next information, storing, via the processor, in the memory, as the catalog information, the next backup data creation time created under the control of the active-state host computer, and the identifiers of the one or more third logical volumes that store the backup data; and (M) by referencing, via the processor, the catalog information for management use, displaying on the input/output device a creation time of the next backup data stored in the fourth logical volume as a creation time of the backup data corresponding to the application program, and suppressing the display of the creation time of the backup data stored in the third logical volume.

6. A non-transitory computer readable storage medium storing a management program, which when executed, causes a management method to be performed, the management method for managing a storage system, the storage system providing a plurality of logical volumes and being configured from one or more apparatuses, the storage system providing a plurality of host computers which are coupled to a port, the method comprising:

storing cluster information in a memory;

detecting, via a processor, a failover that has occurred in the plurality of host computers and updating the cluster information;

receiving, via an input/output device, a backup setting request including a virtual host identifier for input use, and application instance identifier for input use, and a backup schedule input value;

(A) specifying, via the processor, by referencing the cluster information, an active-state host computer corresponding to the virtual host identifier for input use, and an inactive-state host computer corresponding to the active-state host computer included in the plurality of host computers;

(B) specifying, via the processor, a first storage subsystem included in the storage system, and a first logical volume provided by the first storage subsystem, which the active-state host computer accesses by executing and application program identified by the application instance identifier for input use;

(C) determining via the processor, whether the inactive-state host computer is able to access the first storage subsystem and the first logical volume;

(D) selecting, via the processor, in a case where the inactive-state host computer is not able to access the first logical volume, a second storage subsystem included in the storage system that is accessible from the inactive-state host computer, and sending to the first storage subsystem a replication establishment instruction for disaster recovery use, with the first logical volume being made a copy source, and a second logical volume provided by the second storage subsystem being made a copy destination; and (E) by sending, via the processor, to the active-state host computer, via the port, a backup schedule registration instruction including backup schedule instruction information created on the basis of the backup schedule input value, causing the active-state host computer to control a replication process, for backup use, with the first logical volume in accordance with the backup schedule input value being made the copy source, and with one or more thirst logical volumes included in the first storage subsystem being made copy destinations.

7. A non-transitory computer readable storage medium according to claim 6, the method further comprising:

(F) by acquiring, via the processor, replication process information format the active-state host computer, storing in the memory as catalog information for management use a creation time of backup data created in accordance with the backup schedule input value and the identifiers of the one or more third logical volumes that store the backup data; and (G) by referencing, via the processor, the catalog information for management use, displaying on the input/output device one or more creation times of the backup data corresponding to the application program specified by the virtual host identifier for input use and the application instance identifier for input use.

8. A non-transitory computer readable storage medium according to claim 7, the method further comprising:

receiving, via the input/output device, a restore instruction specifying a prescribed backup data inputted based on the virtual host identifier for input use and the application instance identifier for input use, and displaying the backup data creation time; and specifying, via the processor, one of the third logical volumes that store backup data specified by the restore instruction, and by sending the restore instruction specifying one of the specified third logical volumes to the active-state host computer, causing the storage system to return the backup data stored in one of the third logical volumes to the first logical volume.

9. A non-transitory computer readable storage medium according to claim 8, wherein, in a case where the inactive-state host computer becomes a next active-state host computer by taking over processing of the application program from the active-state host computer as the result of a failover:

(H) acquiring, via the processor, next information for controlling the replication process, which the next active-state host computer takes over from the active-state host computer;

(I) in accordance with this next information, storing, via the processor, in the memory, as the catalog information, a next backup data creation time created under the control of the active-state host computer, and the identifiers of the one or more third logical volumes that store the backup data; and (J) by referencing, via the processor, the catalog information for management use, displaying on the input/output device the next backup data creation time as a creation time of the backup data corresponding to the application program.

10. A non-transitory computer readable storage medium according to claim 8, wherein, in a case where the inactive-state host computer becomes a next active-state host computer by taking over the execution of the application program from the active-state host computer as the result of a failover without being able to access the first storage subsystem:

(K) acquiring, via the processor, the next information for controlling the next backup replication process, with the second logical volume based on the backup schedule input value being made the copy source while one or more fourth logical volumes provided by the second storage subsystem being made the copy destinations;

(L) in accordance with the next information, storing, via the processor, in the memory, as the catalog information, the next backup data creation time created under the control of the active-state host computer, and the identifiers of the one or more third logical volumes that store the backup data; and (M) by referencing, via the processor, the catalog information for management use, displaying on the input/output device a creation time of the next backup data stored in the fourth logical volume as a creation time of the backup data corresponding to the application program, and suppressing the display of the creation time of the backup data stored in the third logical volume.

\* \* \* \* \*